(12) United States Patent
Wisniewski

(10) Patent No.: US 12,705,945 B2
(45) Date of Patent: Aug. 11, 2026

(54) LOCAL CACHE-BASED IDENTIFICATION SYSTEM

(71) Applicant: Secure Identity, LLC, New York, NY (US)

(72) Inventor: Rob Wisniewski, New York, NY (US)

(73) Assignee: Secure Identity, LLC, New York, NY (US)

( * ) Notice: Subject to any disclaimer, the term of this patent is extended or adjusted under 35 U.S.C. 154(b) by 0 days.

(21) Appl. No.: 18/979,573

(22) Filed: Dec. 12, 2024

(65) Prior Publication Data

US 2025/0111730 A1 Apr. 3, 2025

Related U.S. Application Data

(63) Continuation of application No. 18/223,764, filed on Jul. 19, 2023, now Pat. No. 12,205,444, which is a continuation of application No. 17/704,314, filed on Mar. 25, 2022, now Pat. No. 11,756,364, which is a continuation of application No. 16/679,529, filed on Nov. 11, 2019, now Pat. No. 11,321,989.

(Continued)

(51) Int. Cl.

| | |
|---|---|
| ***G07C 9/25*** | (2020.01) |
| ***G06Q 20/04*** | (2012.01) |
| ***G06Q 20/10*** | (2012.01) |
| ***G06Q 20/20*** | (2012.01) |
| ***G06Q 20/34*** | (2012.01) |
| ***G06Q 20/40*** | (2012.01) |
| ***G07F 7/10*** | (2006.01) |

(52) U.S. Cl.

CPC ........... *G07F 7/1008* (2013.01); *G06Q 20/04* (2013.01); *G06Q 20/10* (2013.01); *G06Q 20/20* (2013.01); *G06Q 20/341* (2013.01); *G06Q 20/40145* (2013.01); *G07C 9/257* (2020.01)

(58) Field of Classification Search

CPC ..... G07C 9/25; G07C 9/257; G06Q 20/40145

USPC ........................................ 235/382, 487, 494

See application file for complete search history.

(56) References Cited

U.S. PATENT DOCUMENTS

| | | | |
|---|---|---|---|
| 6,119,096 | A | 9/2000 | Mann et al. |
| 8,381,969 | B1 | 2/2013 | Miller et al. |

(Continued)

OTHER PUBLICATIONS

Trochu et al., "Managing the Border, Smartly," European and Security Informatics Conference, IEEE, pp. 281-284, Aug. 12, 2013.

*Primary Examiner* — Paultep Savusdiphol

(74) *Attorney, Agent, or Firm* — Brownstein Hyatt Farber Schreck, LLP

(57) ABSTRACT

An identification system uses a local cache for performing identifications. An identity system device may store identity information and identification information. An electronic device stores a cache of a portion of the identity information and a part of the identification information. The electronic device receives user input, determines an identity by comparing the user input to the cached identification information (such as by comparing a received digital representation of a biometric with cached biometric identification information), and performs an action using information in the cached identity information that is associated with the identity. The electronic device may update the identity information stored by the identity system device based on the action.

20 Claims, 14 Drawing Sheets

Related U.S. Application Data

(60) Provisional application No. 62/785,721, filed on Dec. 28, 2018.

(56) References Cited

U.S. PATENT DOCUMENTS 8,423,462 B1 4/2013 Amacker et al.
8,521,131 B1 8/2013 Ramalingam et al.
8,744,966 B1 6/2014 Amacker et al.
8,965,170 B1 2/2015 Benea
9,107,064 B1 8/2015 Ramalingam et al.
9,166,961 B1 10/2015 Johansson et al.
9,202,105 B1 12/2015 Wang et al.
9,324,098 B1 4/2016 Agrawal et al.
9,386,507 B1 7/2016 Ramalingam et al.
9,607,138 B1 3/2017 Baldwin et al.
9,609,577 B1 3/2017 Ramalingam et al.
9,681,350 B1 6/2017 Marupaduga et al.
9,681,359 B2 6/2017 Ramalingam et al.
9,723,131 B1 8/2017 Ramalingam et al.
9,836,642 B1 12/2017 Ramaswamy
9,934,504 B2 4/2018 Wang et al.
9,947,155 B2 * 4/2018 Trani ...................... G06F 21/32
9,967,250 B2 5/2018 Johansson et al.
10,027,662 B1 7/2018 Mutagi et al.
10,055,740 B2 8/2018 Hanson et al.
10,104,181 B1 10/2018 Rao et al.
10,108,791 B1 10/2018 Masterman
10,108,961 B2 10/2018 Wang et al.
10,122,727 B2 11/2018 Johansson et al.
10,235,669 B2 3/2019 Amacker et al.
10,242,364 B2 3/2019 Wang et al.
10,243,945 B1 3/2019 Kruse et al.
10,403,066 B2 * 9/2019 Trani ...................... H04W 4/80
10,929,661 B1 2/2021 Manyam
11,151,481 B1 10/2021 Sun et al.
2004/0172403 A1 9/2004 Steele
2004/0221303 A1 11/2004 Sie
2006/0083408 A1 * 4/2006 Hoffman ................ G06Q 20/40 705/14.27
2006/0279422 A1 * 12/2006 Sweatte ................. G07C 9/257 340/5.82
2007/0206839 A1 9/2007 Hanna et al.
2008/0126809 A1 5/2008 Rothschild et al.
2010/0245041 A1 * 9/2010 Aoki ........................ G07C 9/37 340/5.82
2010/0312763 A1 12/2010 Peirce
2010/0316262 A1 * 12/2010 Kuwahara .............. G06V 10/95 382/115
2012/0019379 A1 1/2012 Ben Ayed
2013/0002399 A1 * 1/2013 Frueh ..................... G07C 9/257 340/5.52
2013/0036309 A1 2/2013 Kevenaar et al.
2013/0036480 A1 2/2013 Anderson et al.
2013/0051630 A1 2/2013 Marques et al.
2013/0251216 A1 9/2013 Smowton et al.
2014/0189720 A1 7/2014 Terrazas
2014/0314283 A1 10/2014 Harding et al.
2015/0294515 A1 10/2015 Bergdale
2016/0026782 A1 1/2016 Smowton et al.
2016/0055327 A1 2/2016 Moran et al.
2016/0189063 A1 6/2016 Nie
2016/0269411 A1 9/2016 Malachi et al.
2016/0343187 A1 * 11/2016 Trani .................... H04W 4/021
2016/0344091 A1 * 11/2016 Trani ................... H01Q 9/0407
2017/0188103 A1 6/2017 Pan
2017/0318141 A1 11/2017 Gerace et al.
2018/0005160 A1 1/2018 Johnson, III et al.
2018/0007060 A1 1/2018 Leblang et al.
2019/0036939 A1 1/2019 Johansson et al.
2019/0050631 A1 2/2019 Hayase
2019/0333070 A1 * 10/2019 Lochan Dass ..... G06Q 20/3829
2020/0028971 A1 1/2020 Rapp et al.
2020/0211312 A1 7/2020 Wisniewski
2021/0201061 A1 * 7/2021 Lupowitz .............. G06F 18/211
2021/0264185 A1 8/2021 Lupowitz

* cited by examiner

LOCAL CACHE-BASED IDENTIFICATION SYSTEM

CROSS-REFERENCE TO RELATED APPLICATION(S)

This application is a continuation patent application of U.S. patent application Ser. No. 18/223,764, filed Jul. 19, 2023 and titled "Local Cache-Based Identification System," which is a continuation patent application of U.S. patent application Ser. No. 17/704,314, filed Mar. 25, 2022 and titled "Local Cache-Based Identification System," now U.S. Pat. No. 11,756,364, which is a continuation patent application of U.S. patent application Ser. No. 16/679,529, filed Nov. 11, 2019 and titled "Local Cache-Based Identification System," now U.S. Pat. No. 11,321,989, which is a nonprovisional patent application of and claims the benefit of U.S. Provisional Patent Application No. 62/785,721, filed Dec. 28, 2018 and titled "Local Cache-Based Identification System," the disclosures of which are hereby incorporated herein by reference in their entireties.

FIELD

The described embodiments relate generally to identification systems. More particularly, the present embodiments relate to identification systems that use a local cache for performing identifications.

BACKGROUND

Various electronic devices may use identity information for people to perform a number of different actions. Identity information may include a name, an address, entitlements (such as purchased tickets), financial information, and/or any other information associated with a person's identity. For example, a security kiosk may access identity information to determine a person's name as part of screening the person for entry into a secured area, such as an airport. Such electronic devices may protect the identity information to restrict use of the identity information. For example, an electronic device may require login to an account associated with the identity information prior to taking any action that uses the identity information.

In some situations, the identity information may be maintained and stored at the electronic device that uses the identity information. This enables the electronic device to perform actions using the identity information. In other situations, a central system maintains and stores the identity information and allows access to remote electronic devices. This enables multiple electronic devices to perform actions using the identity information.

SUMMARY

The present disclosure relates to an identification system that uses a local cache for performing identifications. An identity system device may store identity information and identification information. One or more electronic devices may store a cache of a portion of the identity information and a part of the identification information. Such an electronic device may allow controlled access to the cached identity information using the cached identification information. For example, the cached identification information may include cached biometric identification information. The electronic device may receive user input, determine an identity by comparing the user input to the cached identification information, and perform an action using information in the cached identity information that is associated with the identity. In this way, the electronic device performs identifications locally without requiring communication with the identity system device but also uses the identity system device to centrally store and maintain the identity information and the identification information that is used to protect the identity information.

In various embodiments, an identification system that uses a local cache for performing identifications includes an identity system device that stores identity information and biometric identification information and an electronic device that includes a biometric reader device, a communication unit, a non-transitory storage medium that stores instructions, and a processor. The processor executes the instructions to receive from the identity system device, using the communication unit, an identity information cache that constitutes a portion of the identity information from the identity system device; receive from the identity system device, using the communication unit, a biometric identification information cache that constitutes a part of the biometric identification information; obtain a digital representation of a biometric via the biometric reader device; determine an identity by comparing the digital representation of the biometric to the biometric identification information cache; perform an action using information in the identity information cache that is associated with the identity; and transmit a notification to the identity system device, using the communication unit, to update based on the action a subset of the identity information associated with the identity.

In some examples, the identity system device determines parameters for identities to cache, selects the portion of the identity information and the part of the biometric identification information according to the parameters, and transmits the portion of the identity information and the part of the biometric identification information to the electronic device. In some implementations of such examples, the parameters include a list of ticket holders or a flight manifest.

In various examples, the digital representation of the biometric is a first digital representation of a first biometric, the identity is a first identity, and the processor obtains a second digital representation of a second biometric, determines the second digital representation of the second biometric does not have a match in the biometric identification information cache, and determines a second identity by transmitting the second digital representation of the second biometric to the identity system device. In some implementations of such examples, the information is first information and the processor receives second information in the identity information that is associated with the second identity from the identity system device.

In some examples, the processor deletes the digital representation of the biometric upon determining the identity. In various examples, a communication link between the electronic device and the identity system device is unavailable while the processor determines the identity.

In some embodiments, an electronic device includes a biometric reader device, a communication unit, a non-transitory storage medium that stores instructions, and a processor. The processor executes the instructions to cache identity information and biometric identification information received, using the communication unit, from an identity system device of an identification system that uses a local cache for performing identifications; obtain a digital representation of a biometric via the biometric reader device; determine an identity by comparing the digital representation of the biometric to the biometric identification information; and perform an action using a portion of the identity information that is associated with the identity.

In various examples, the action includes allowing access. In some implementations of such examples, the electronic device further includes an access control mechanism and the processor allows the access by controlling the access control mechanism.

In some examples, the identity information includes a verified age. In various examples, the identity information includes payment information.

In various examples, the biometric reader device includes at least one of a fingerprint scanner, an optical fingerprint scanner, a phosphorescent fingerprint scanner, a camera, an image sensor, a heart rhythm monitor or other biological sensor, or a microphone. In some examples, the digital representation of the biometric includes a digital representation of at least one of a fingerprint, a voiceprint, a facial image, a retina image, an iris image, a heart rhythm or other biological information, or a gait.

In various embodiments, an electronic device includes a biometric reader device, a communication unit, a non-transitory storage medium that stores instructions, and a processor. The processor executes the instructions to determine parameters for identities to cache; obtain identity information and biometric identification information, using the communication unit, that correspond to the parameters from an identity system device of an identification system that uses a local cache for performing identifications; store the identity information and the biometric identification information in the non-transitory storage medium; obtain a digital representation of a biometric via the biometric reader device; and determine an identity by comparing the digital representation of the biometric to the biometric identification information.

In some examples, the processor performs an action using information in the identity information corresponding to the identity and deletes the identity information and the biometric identification information after performing the action. In some implementations of such examples, the action includes allowing entrance based on a ticket and the processor updates a status of the ticket in the identity information based on the entrance.

In various examples, the parameters include permitted entrants. In some examples, the electronic device is a component of a vehicle. In various implementations of such examples, the parameters include permitted vehicle operators.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
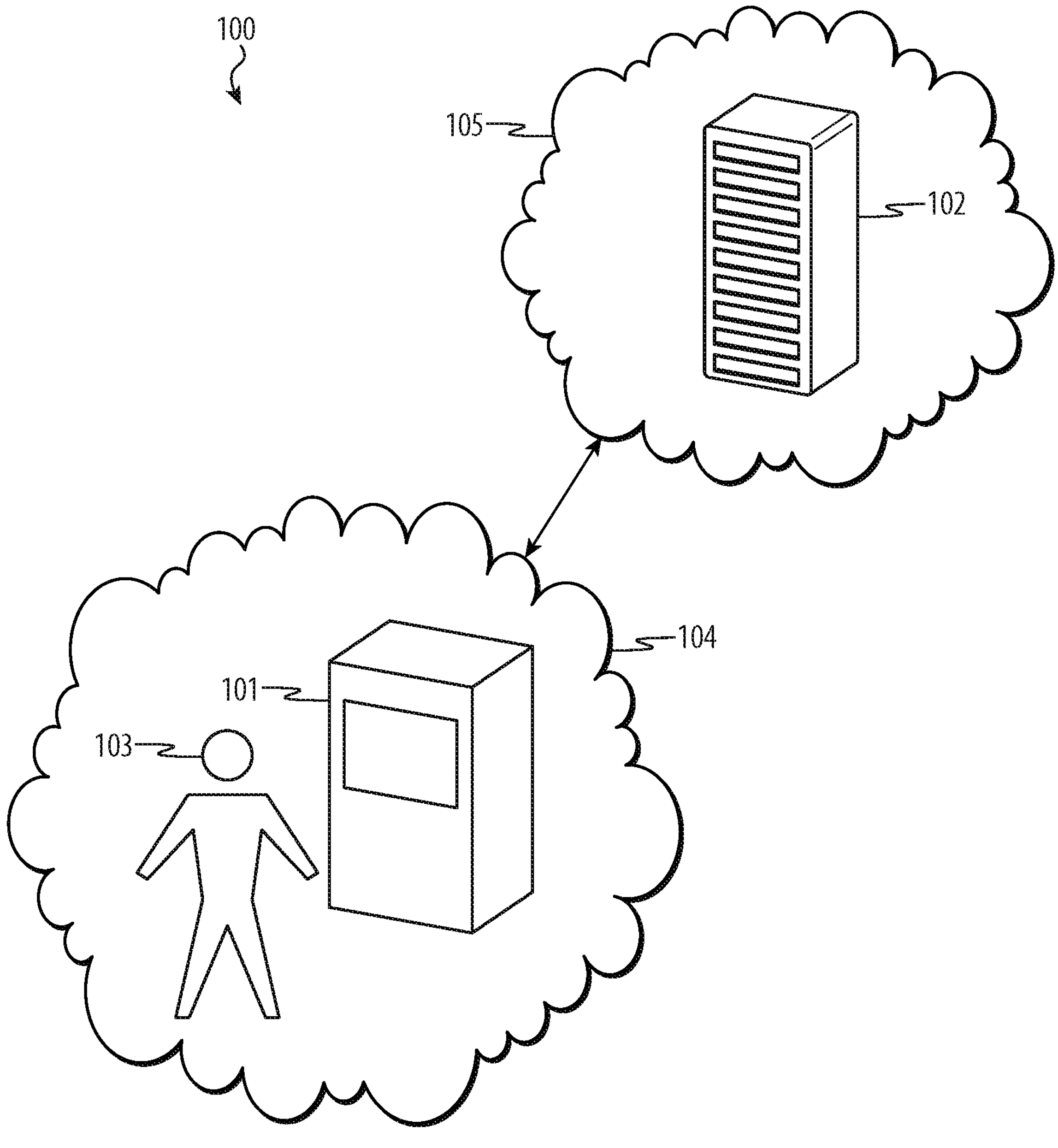
FIG. 1 depicts a first example identification system that uses a local cache for performing identifications.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Implementations where an electronic device maintains and stores identity information may not be very flexible as such implementations do not support multiple electronic devices using the identity information, particularly different kinds of electronic devices. Further, each electronic device may be configured with the identity information before use. This may be burdensome and complex, as well as multiplying storage requirements for the identity information. Each time a new electronic device is to use the identity information, the new electronic device is separately configured to use the identity information.

Implementations where a central system maintains and stores the identity information may support use of the identity information by multiple electronic devices and/or different kinds of electronic devices. This may be very flexible as new electronic devices communicate with the central system for identity information rather than requiring separate identity information configuration. However, electronic devices in such an arrangement may be unable to function if a communication link between the electronic device and the central system becomes unavailable. Further, the speed at which the electronic device operates may be dependent on the speed at which the electronic device may communicate with the central system.

The following disclosure relates to an identification system that uses a local cache for performing identifications. An identity system device may store identity information and identification information. One or more electronic devices may store a cache of a portion of the identity information and a part of the identification information. Such an electronic device may allow controlled access to the cached identity information using the cached identification information. For example, the cached identification information may include cached biometric identification information. The electronic device may receive user input, determine an identity by comparing the user input to the cached identification information, and perform an action using information in the cached identity information that is associated with the identity. In this way, the electronic device performs identifications locally without requiring communication with the identity system device but also uses the identity system device to centrally store and maintain the identity information and the identification information that is used to protect the identity information.

In some implementations, the electronic device may update the identity information stored by the identity system device according to the action. In various implementations, the portion of the identity information and the part of the identification information cached at an electronic device may be selected according to one or more parameters. Such parameters may be associated with the function of the electronic device, a location of the electronic device, a time period, and/or other factors.

The above may allow electronic devices to function even when communication between the electronic device and the identity system device is unavailable. This may also allow local use of centrally maintained information, free up the electronic devices from separately maintaining and storing the information, improve the speed of electronic device performance by making the performance independent of the speed of communication between electronic devices and the identity system device, and so on. This may also enable the electronic devices to perform functions not previously performable as the identity information may be updated based on actions performed by other electronic devices that affect the identity information.

These and other embodiments are discussed below with reference to FIGS. 1-14. However, those skilled in the art will readily appreciate that the detailed description given herein with respect to these figures is for explanatory purposes only and should not be construed as limiting.

FIG. 1 depicts a first example identification system 100 that uses a local cache for performing identifications. The identification system 100 may include one or more local electronic devices 101 (which may be located at one or more local locations 104) and one or more identity system devices 102 (which may be located at one or more remote locations 105). The identity system device 102 may store and maintain identity information (e.g., information about a person such as name, address, financial information, social security number, phone number, previous actions by a person, and so on) and identification information (i.e., information that may be used to determine the identity of a person). The local electronic device 101 may store a cached portion of the identity information and part of the identification information. The local electronic device 101 may receive user input from a person 103, determine an identity for the person 103 by comparing the user input to cached identification information, and perform an action using information in cached identity information that is associated with the identity of the person 103. In this way, the local electronic device 101 may be able to perform identifications locally without requiring communication with the identity system device 102. At the same time, the identification system 100 may use the identity system device 102 to centrally store and maintain the identity information and the identification information. In some implementations, the local electronic device 101 may also update the identity information stored by the identity system device 102 according to the action, such as by transmitting one or more notifications regarding the action to the identity system device 102.

These features may allow the local electronic device 101 to function even when communication between the local electronic device 101 and the identity system device 102 is unavailable. This may also allow local use of centrally maintained information, free up the local electronic device 101 from separately maintaining and storing the information, improve the speed of local electronic device 101 performance by making the performance independent of the speed of communication between local electronic device 101 and the identity system device 102, and so on. This may also enable the local electronic device 101 to perform functions not previously performable as the identity information may be updated based on actions performed by other electronic devices that affect the identity information.

The identity information may include a name, an address, entitlements (such as purchased tickets), financial information, and/or any other information associated with a person's identity. For example, the local electronic device 101 may be a security kiosk that may access identity information to determine a person's name as part of screening the person for entry into a secured area, such as an event venue, a building, an airport, and so on. By way of another example, the local electronic device 101 may be a point of sale device that may access identity information to determine a person's financial information as part of processing payment for a transaction. In yet another example, the local electronic device 101 may be a ticket processing station at an event venue that that may access identity information to determine whether or not a person has a valid ticket for entrance. In still another example, the local electronic device 101 may be an age verification device that may access identity information to determine whether or not a person is of a threshold age, such as eighteen or twenty one. Various configurations are possible and contemplated without departing from the scope of the present disclosure.

By allowing use of identity information upon receipt of user input that matches associated identification information, the identification system 100 may protect the identity information by restricting access to the identity information. For example, the local electronic device 101 may include a biometric reader device (such as a fingerprint scanner, a camera and/or other 2D or 3D image capture device, a microphone, a heart rhythm monitor or other biological sensor, and so on) that is operable to obtain or receive a digital representation of a biometric (such as one or more hashes or other digital representations of one or more fingerprints, facial images, iris images, retina images, voiceprints, gaits, a heart rhythms or other biological information, and so on) from the person 103 and the cached identification information may include biometric data associated with identities corresponding to the cached identity information. By way of another example, the local electronic device 101 may include one or more keyboards, touch screens, and/or other input/output devices and the person 103 may use such to provide login information for an account and the cached identification information may include account information. Various configurations are possible and contemplated without departing from the scope of the present disclosure.

The identity information and the identification information cached by the local electronic device 101 may be cached in a variety of different ways. In some implementations, the local electronic device 101 and/or the identity system device 102 may determine one or more parameters for identities to cache, obtain identity information and biometric identification information that corresponds to the parameters, and store the obtained identity information and biometric identification in the cache at the local electronic device 101. Such parameters may be associated with the function of the local electronic device 101, the location 104 of the local electronic device 101, a time period, and/or other factors. For example, the local electronic device 101 may be a ticket kiosk at an event venue and the parameters may include people who have a valid ticket for the event. By way of another example, the local electronic device 101 may be an airport security station and the parameters may include people who have a flight at that airport and/or that terminal and/or that gate within twenty four hours. In yet another example, the local electronic device 101 may be a point of sale device on a flight and the parameters may include a flight manifest of people scheduled to be on that flight. By way of another example, the local electronic device 101 may be a vehicle and the parameters may include a list of people who are permitted to operate the vehicle. In still another example, the local electronic device 101 may be a grocery store checkout device and the parameters may include people who frequent that particular grocery store. Various configurations are possible and contemplated without departing from the scope of the present disclosure.

One or more identity system devices 102 may use information obtained from one or more local electronic devices 101 in a variety of different ways. For example, in some implementations, a local electronic devices 102A-D may be a security screening device at an airport. An identity system device 102 may receive information such as determined identity, ticket data (such as flight numbers, gate numbers, terminal numbers, flight times, and so on) from such a security screening device and use such information to perform tasks, such as verifying that an identity is associated with a valid identification (such as a driver's license, passport, and so on), implementing a multiple lane screening system, and so on. For example, the identity system device 102 may use the information to adjust personnel and/or other resources to manage expected flow; create expedited lines based on which passengers are early, late, and so on; create expedited and/or other adjusted lines for staff as opposed to passengers; create different lines for differently levels of tickets, rewards or other loyalty programs, and so on; create different lines for different levels of security (such as routing trusted people to minimized screening lines and riskier people to additional screening lines, and so on); and so on. The identity system device 102 (and/or the local electronic device 101) may use information from the local electronic devices 101 in a variety of different ways to perform various functions that might not otherwise be possible without such information.

Additionally, although this example is provided in the context of airport security, it is understood that this is an example. Such techniques may be performed in other contexts (such as in the context of a stadium or other event venue, vehicle, and so on) without departing from the scope of the present disclosure. Various configurations are possible and contemplated.

Although the above illustrates and describes caching information (such as identity information and/or identification information) at a local electronic device 101, this an similar examples below are simplified examples for the purposes of clarity. In various implementations, the local electronic device 101 may be a local network of electronic devices. For example, a central server computing device at a stadium may cache information (such as identity information and/or identification information) from one or more identity system devices 102 and provide access to such cached information to one or more stations and/or other electronic devices at the stadium. By way of another example, a server computing device on an aircraft may cache information (such as identity information and/or identification information) from one or more identity system devices 102 and provide access to such cached information to one or more stations and/or other electronic devices at individual passenger seats. Various configurations are possible and contemplated without departing from the scope of the present disclosure.

Further, although the above illustrates and describes one or more identity system devices 102 caching information (such as identity information and/or identification information) at a local electronic device 101, this an similar examples below are simplified examples for the purposes of clarity. In various implementations, the identity system device 102 may communicate with one or more third party databases and/or other electronic devices to obtain information to cache at a local electronic device 101 and/or to update with information obtained from a local electronic device 101. Such third party databases and/or other electronic devices may include one or more black lists (such as a federal no fly list), driver's license databases, criminal watch lists, payment processing systems, and/or any other kind of third party database and/or other electronic device. Various configurations are possible and contemplated without departing from the scope of the present disclosure.

Figure 2:
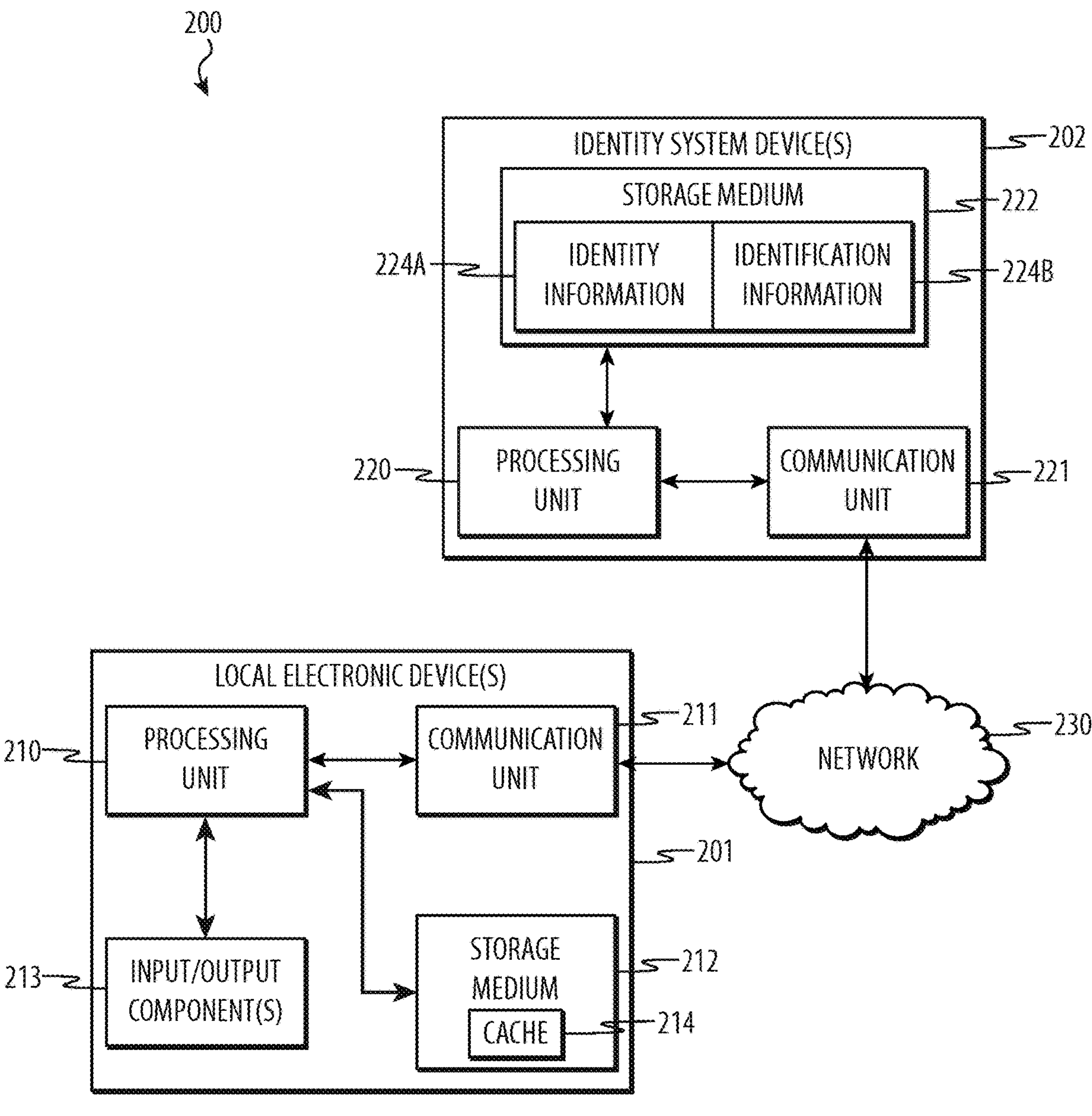
FIG. 2 depicts a second example identification system that uses a local cache for performing identifications.

FIG. 2 depicts a second example identification system 200 that uses a local cache for performing identifications. The identification system 200 may include one or more local electronic devices 201 that are operable to communicate with one or more identity system devices 202 via one or more wired and/or wireless communication networks 230.

The local electronic device 201 may include one or more processing units 210 or other processors or controllers, one or more communication units 211, one or more non-transitory storage media 212 (which may take the form of, but is not limited to, a magnetic storage medium; optical storage medium; magneto-optical storage medium; read only memory; random access memory; erasable programmable memory; flash memory; and so on), one or more input/output components 213 (such as one or more keyboards; touch screens; mice; biometric reader devices like a fingerprint scanner, an optical fingerprint scanner, a phosphorescent fingerprint scanner, a camera and/or other 2D or 3D image capture device, an image sensor, a microphone, a heart rhythm monitor or other biological sensor, and/or any other device operative to obtain a digital representation of a biometric; and so on). Similarly, the identity system device 202 may include one or more processing units 220 or other processors or controllers, communication units 221, non-transitory storage media 222, and so on.

The identity system device 202 may store identity information 224A and/or identification information 224B in the storage medium 222. The identity information 224A may be associated with the identification information 224B. The local electronic device 201 may store one or more caches 214 in the storage medium 212. The local electronic device 201 may store a portion of the identity information 224A and/or a part of the identification information 224B in the cache 214.

The processing unit 210 of the local electronic device 201 may execute instructions stored in the storage medium 212 to perform various functions. For example, the functions may include communicating with the identity system device 202 via the network 230 using the communication unit 211, storing information in the cache 214, obtaining user input via the input/output component 213, determining an identity by comparing user input to cached identification information, performing one or more actions using information in cached identity information, the various functions discussed above as performed by the local electronic device 101 of FIG. 1, and so on. Similarly, the processing unit 220 of the identity system device 202 may execute instructions stored in the storage medium 222 to perform various functions. For example, the functions may include communicating with the local electronic device 201 via the network 230 using the communication unit 221, storing and/or maintaining the identity information 224A and/or the identification information 224B the various functions discussed above as performed by the identity system device 102 of FIG. 1, and so on.

The local electronic device 201 may be any kind of electronic device without departing from the scope of the present disclosure. For example, the local electronic device 201 may be a desktop computing device, a laptop computing device, a mobile computing device, a tablet computing device, a mobile telephone, a smart phone, a digital media player, a wearable device, a vehicle, a kitchen appliance, a point of sale terminal, a kiosk, and so on. Similarly, the identity system device 202 may be any kind of electronic device without departing from the scope of the present disclosure.

Figure 3:
FIG. 3 depicts a flow chart illustrating a first example method for using a local cache to perform identifications. This method may be performed by the systems of FIGS. 1 and/or 2.
Figure 3:
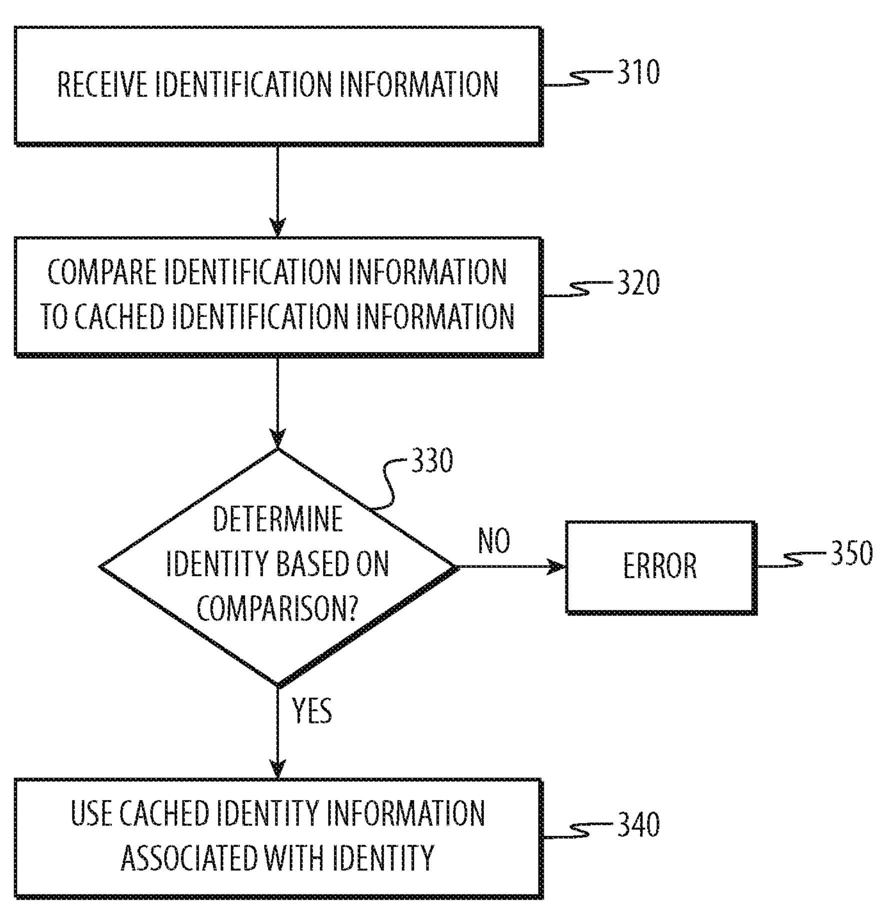

FIG. 3 depicts a flow chart illustrating a first example method 300 for using a local cache to perform identifications. This method 300 may be performed by the systems 100, 200 of FIGS. 1 and/or 2.

At operation 310, an electronic device (such as the local electronic device 101, 201 of FIGS. 1 and/or 2) may receive identification information. The identification information may be any kind of information that may be used to determine an identity. For example, the identification information may be one or more digital representations of a biometric. In another example, the identification information may be a login for an account. In still other implementations, the identification information may be a combination of the two. Various configurations are possible and contemplated without departing from the scope of the present disclosure. In some examples, the cached identification information may be a portion of identification information maintained and stored by an identity system device, such as a central identity information database. In such examples, the electronic device may generate the cached identification information by storing information received from the identity system device.

At operation 320, the electronic device may compare the identification information to cached identification information. For example, the electronic device may determine whether or not there is a match between the identification information and the cached identity information. In some examples, the cached identity information may be a portion of identity information maintained and stored by an identity system device, such as a central identity information database. In such examples, the electronic device may generate the cached identity information by storing information received from the identity system device.

At operation 330, the electronic device may determine whether or not an identity can be determined based on the comparison. If so, the flow may proceed to operation 340. Otherwise, the flow may proceed to operation 350 where the electronic device may determine that an error has occurred.

At operation 340, after the electronic device determines an identity based on the comparison between the identification information to the cached identification information, the electronic device may use cached identity information associated with the identity. The electronic device may use the cached identity information to perform one or more actions. For example, the electronic device may obtain a name stored in the cached identity information, determine an entitlement indicated in the cached identity information, allow entrance based on an entitlement indicated in the cached identity information, update an entitlement indicated in the cached identity information based on an action that the electronic device performs, verify an age indicated in the cached identity information, process a payment using financial information (such as a credit card, bank account number, rewards account, airline miles, a credit account created by the electronic device using information stored in the cached identity information, and so on) stored in the cached identity information, and so on.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as the electronic device determining an error occurs if an identity cannot be determined based on the comparison between the identification information and cached identification information. However, it is understood that this is an example. In some implementations, the electronic device may instead transmit the identification information to another device to determine the identity if the electronic device cannot determine the identity based on the comparison. Various configurations are possible and contemplated without departing from the scope of the present disclosure.

In various examples, this example method 300 may be implemented as a group of interrelated software modules or components that perform various functions discussed herein. These software modules or components may be executed within a cloud network and/or by one or more computing devices, such as the local electronic device 101, 201 of FIGS. 1 and/or 2.

Figure 4:
FIG. 4 depicts a flow chart illustrating an example method for local caching for performing identifications. This method may be performed by the systems of FIGS. 1 and/or 2.
Figure 4:
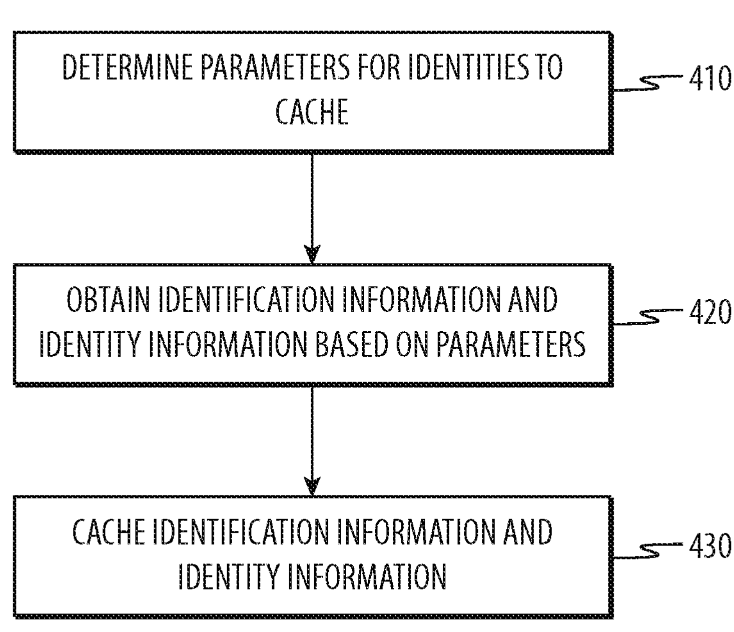

FIG. 4 depicts a flow chart illustrating an example method 400 for local caching for performing identifications. This method 400 may be performed by the systems 100, 200 of FIGS. 1 and/or 2.

At operation 410, an electronic device (such as the local electronic device 101, 201 of FIGS. 1 and/or 2 and/or the identity system device 102, 202 of FIGS. 1 and/or 2) may determine parameters for identities to cache. Such parameters may be associated with the function of an electronic device that will use the cache, the location of the electronic device that will use the cache, a time period, and/or other factors. For example, when creating a cache for a security kiosk at an airport, the parameters may include a list of flight manifests for all passengers with flights at that airport for the next day.

At operation 420, the electronic device may obtain identification information and identity information based on the parameters. For example, the electronic device may obtain a portion of identification information and identity information stored by an identity system device and/or a database maintained by the identity system device that satisfies the parameters.

At operation 430, the electronic device may cache the obtained identification information and identity information at an electronic device that will use the cache. For example, the electronic device may be the electronic device that will use the cache. In such an example, the electronic device may obtain the identification information and identity information and cache such. In another example, the electronic device may be the identity system device. In such an example, the identity system device may obtain the identification information and identity information and transmit such to the electronic device that will use the cache for performing identifications.

Although the example method 400 is illustrated and described as including particular operations performed in a particular order, it is understood that this is an example. In various implementations, various orders of the same, similar, and/or different operations may be performed without departing from the scope of the present disclosure.

For example, operation 420 is illustrated and described as obtaining the identification information and identity information. However, in some implementations, the electronic device performing the method 400 may be an identity system device that maintains the identification information and identity information from which the identification information and identity information corresponding to the parameters is derived. In such an example, operation 420 may involve deriving the identification information and identity information corresponding to the parameters from the larger body of the identification information and identity information stored and maintained by the identity system device. Various configurations are possible and contemplated without departing from the scope of the present disclosure.

In various examples, this example method 400 may be implemented as a group of interrelated software modules or components that perform various functions discussed herein. These software modules or components may be executed within a cloud network and/or by one or more computing devices, such as the local electronic device 101, 201 of FIGS. 1 and/or 2 and/or the identity system device 102, 202 of FIGS. 1 and/or 2.

In various implementations, an identification system that uses a local cache for performing identifications may include an identity system device that stores identity information and biometric identification information and an electronic device that includes a biometric reader device, a communication unit, a non-transitory storage medium that stores instructions, and a processor. The processor may execute the instructions to receive from the identity system device, using the communication unit, an identity information cache that constitutes a portion of the identity information from the identity system device; receive from the identity system device, using the communication unit, a biometric identification information cache that constitutes a part of the biometric identification information; obtain a digital representation of a biometric via the biometric reader device; determine an identity by comparing the digital representation of the biometric to the biometric identification information cache; perform an action using information in the identity information cache that is associated with the identity; and transmit a notification to the identity system device, using the communication unit, to update based on the action a subset of the identity information associated with the identity.

In some examples, the identity system device may determine parameters for identities to cache, select the portion of the identity information and the part of the biometric identification information according to the parameters, and transmit the portion of the identity information and the part of the biometric identification information to the electronic device. In some such examples, the parameters may include a list of ticket holders or a flight manifest.

In various examples, the digital representation of the biometric may be a first digital representation of a first biometric, the identity may be a first identity, and the processor may obtain a second digital representation of a second biometric, determine the second digital representation of the second biometric does not have a match in the biometric identification information cache, and determine a second identity by transmitting the second digital representation of the second biometric to the identity system device. In some such examples, the information may be first information and the processor may receive second information in the identity information that is associated with the second identity from the identity system device.

In some examples, the processor may delete the digital representation of the biometric upon determining the identity. In various examples, a communication link between the electronic device and the identity system device may be unavailable while the processor determines the identity.

In some implementations, an electronic device may include a biometric reader device, a communication unit, a non-transitory storage medium that stores instructions, and a processor. The processor may execute the instructions to cache identity information and biometric identification information received, using the communication unit, from an identity system device of an identification system that uses a local cache for performing identifications; obtain a digital representation of a biometric via the biometric reader device; determine an identity by comparing the digital representation of the biometric to the biometric identification information; and perform an action using a portion of the identity information that is associated with the identity.

In various examples, the action may include allowing access. In some such examples, the electronic device further may include an access control mechanism and the processor may allow the access by controlling the access control mechanism.

In some examples, the identity information may include a verified age. In various examples, the identity information may include payment information.

In various examples, the biometric reader device may include at least one of a fingerprint scanner, an optical fingerprint scanner, a phosphorescent fingerprint scanner, a camera (and/or other 2D or 3D image capture device), an image sensor, a heart rhythm monitor or other biological sensor, or a microphone. In some examples, the digital representation of the biometric may include a digital representation of at least one of a fingerprint, a voiceprint, a facial image, a retina image, an iris image, a heart rhythm or other biological information, or a gait.

In various implementations, an electronic device may include a biometric reader device, a communication unit, a non-transitory storage medium that stores instructions, and a processor. The processor may execute the instructions to determine parameters for identities to cache; obtain identity information and biometric identification information, using the communication unit, that correspond to the parameters from an identity system device of an identification system that uses a local cache for performing identifications; store the identity information and the biometric identification information in the non-transitory storage medium; obtain a digital representation of a biometric via the biometric reader device; and determine an identity by comparing the digital representation of the biometric to the biometric identification information.

In some examples, the processor may perform an action using information in the identity information corresponding to the identity and delete the identity information and the biometric identification information after performing the action. In some such examples, the action may include allowing entrance based on a ticket and the processor may update a status of the ticket in the identity information based on the entrance.

In various examples, the parameters may include permitted entrants. In some examples, the electronic device may be a component of a vehicle. In various such examples, the parameters may include permitted vehicle operators.

Figure 5:
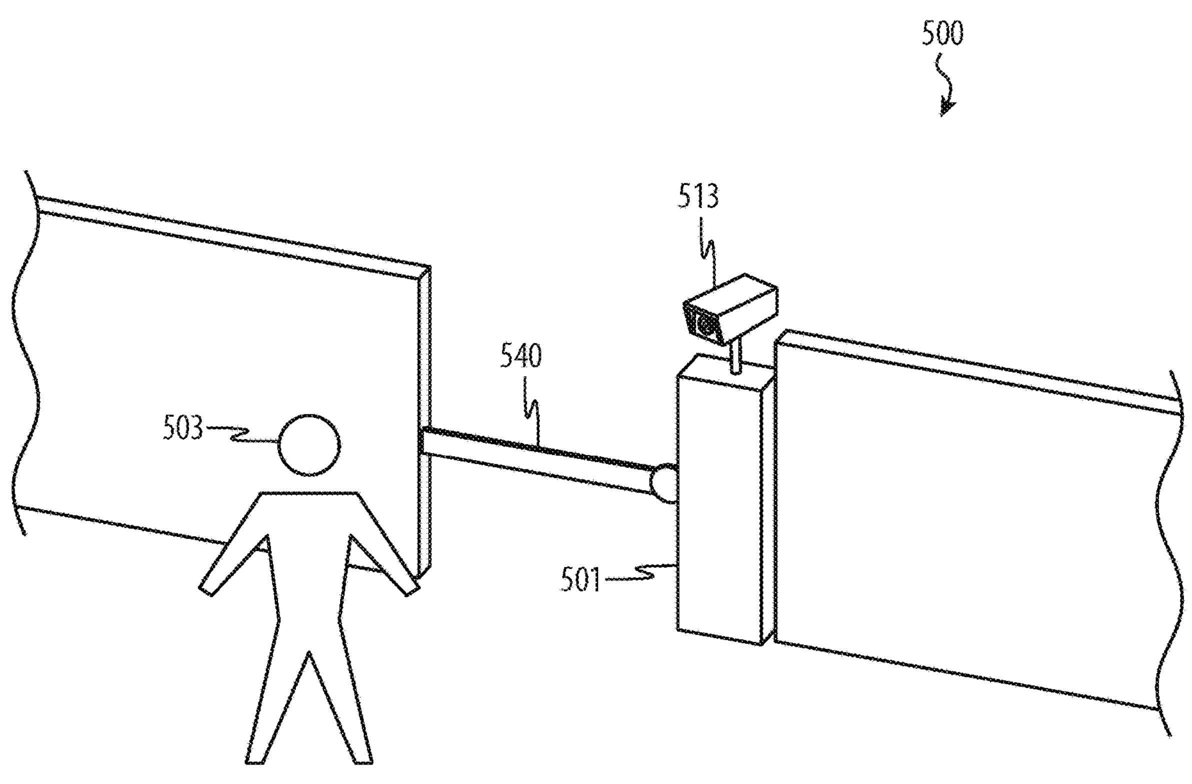
FIG. 5 depicts a third example identification system that uses a local cache for performing identifications.

FIG. 5 depicts a third example identification system 500 that uses a local cache for performing identifications. In this example, the identification system 500 may be a ticket station 501 at a venue that controls access based on whether or not a person 503 has a valid ticket for entrance. The ticket station 501 may include a biometric reader device 513 and an access control mechanism 540. The ticket station 501 may obtain a digital representation of a biometric using the biometric reader device 513, determine an identity by comparing the digital representation of the biometric to cached biometric identification information, and allow access by controlling the access control mechanism 540 if information in the cached identity information associated with the identity indicates that the person 503 has a valid ticket for entrance.

For example, the biometric reader device 513 is illustrated as a camera and the access control mechanism 540 is illustrated as a gate arm. The camera may obtain an image of the person's face, determine an identity by comparing the image to cached facial images, and control the gate arm to allow the person 503 inside if a valid ticket is associated with the identity.

In some implementations, the ticket station 501 may update the cached identity information to reflect the updated status of the ticket after use. For example, if the ticket is a single entry ticket, the ticket station 501 may change the status of the ticket to indicate that the ticket has been used.

In various implementations, the ticket station 501 may transmit a notification to an identity system device that maintains the identity information from which the cached identity information was obtained to update the status of the ticket. Such a notification may be transmitted when the ticket status is changed and/or at various times. For example, the ticket station 501 may transmit notifications to update periodically, such as once per hour, once per day, and so on. By way of another example, the ticket station 501 may transmit notifications to update upon establishing a communication link to the identity system device. Various configurations are possible and contemplated without departing from the scope of the present disclosure.

Figure 6:
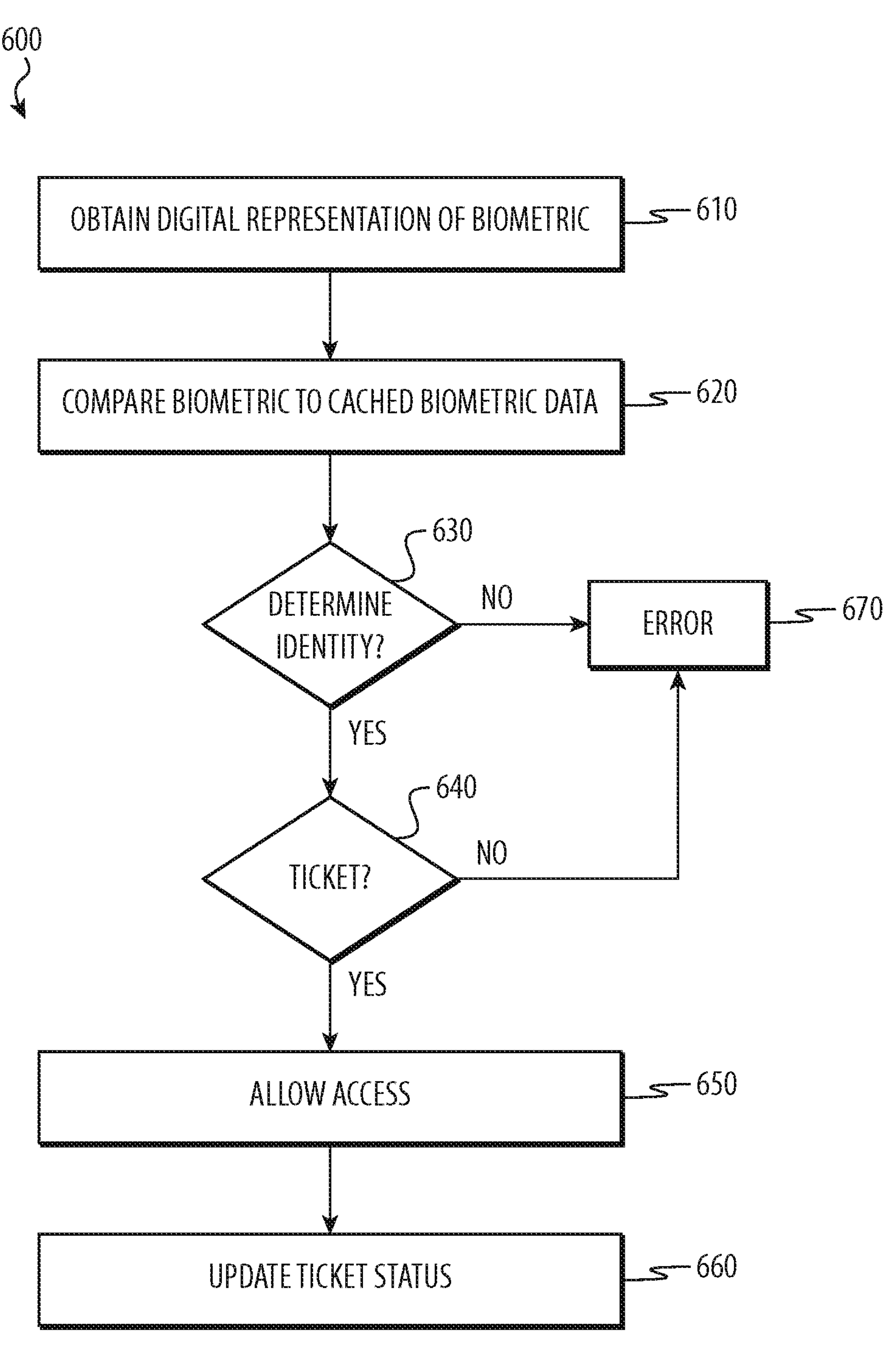
FIG. 6 depicts a flow chart illustrating a second example method for using a local cache to perform identifications. This method may be performed by the systems of FIGS. 2 and/or 5.

FIG. 6 depicts a flow chart illustrating a second example method 600 for using a local cache to perform identifications. This method 600 may be performed by the systems 200, 500 of FIGS. 2 and/or 5.

At operation 610, an electronic device (such as the local electronic device 201 of FIG. 2 and/or the ticket station 501 of FIG. 5) may obtain a digital representation of a biometric. The digital representation of the biometric may be a digital representation of a fingerprint, a voiceprint, a facial image, a retina image, an iris image, a gait, a heart rhythm or other biological information, and so on. The digital representation of the biometric may be obtained using one or more biometric reader devices, such as a fingerprint scanner, an optical fingerprint scanner, a phosphorescent fingerprint scanner, a camera, an image sensor, a microphone, a heart rhythm monitor or other biological sensor, and so on.

At operation 620, the electronic device may compare the digital representation of the biometric to cached biometric data. For example, the cached biometric data may be identification information stored by the electronic device that corresponds to cached identity information also stored by the electronic device.

At operation 630, the electronic device may determine whether or not the electronic device can determine an identity. The electronic device may determine whether or not it can determine an identity based on whether or not the electronic device finds a match between the digital representation of the biometric and the cached biometric data, whether or not the electronic device has cached identity information associated with the cached biometric data that matches the digital representation of the biometric, and so on. If so, the flow proceeds to operation 640. Otherwise, the flow proceeds to operation 670 where the electronic device may determine an error has occurred.

At operation 640, after the electronic device determines the identity, the electronic device may determine whether or not the identity information indicates that a valid ticket is associated with the identity. If so, the flow may proceed to operation 650. Otherwise, the flow may proceed to operation 670 where the electronic device may determine an error has occurred.

At operation 650, after the electronic device determines that a valid ticket is associated with the identity, the electronic device may allow access. The electronic device may allow access by controlling an access control mechanism, such as a gate arm, a door, a turnstile, and/or any other device operable to control access.

At operation 660, the electronic device may update the ticket status. For example, the electronic device may update the cached identity information and/or transmit a notification to an identity system device indicating that the ticket has been used. The update may also involve other information, such as a location where the ticket was used, a person who used the ticket, and/or other such information.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as allowing access or not based on whether or not valid ticket information is indicated in cached identity information. However, it is understood that this is an example. In some implementations, a rewards account may be indicated in the cached identity information that entitles the person to a free or discounted product or service based on use of the ticket. In such implementations, the electronic device may automatically dispense the good or service, provide a voucher for the good or service, transmit a notification regarding the good or service (such as to a device that provides the good or service, to a mobile computing device carried by the person, and so on).

In various implementations, the cached identity information may indicate that the person has the option to upgrade to a higher ticket level (such as a box seat when the valid ticket was for general admission and so on) and the electronic device may prompt the person and/or transmit a notification regarding the option to upgrade. In some examples of such implementations, the cached identity information may indicate that the person has configured default options in such a case and does not want to be bothered by upsells. In such an example, the electronic device may perform the upgrade and/or transmit notifications to accomplish the upgrade automatically according to the default options indicated in the cached identity information. Various configurations are possible and contemplated without departing from the scope of the present disclosure.

In various examples, this example method 600 may be implemented as a group of interrelated software modules or components that perform various functions discussed herein. These software modules or components may be executed within a cloud network and/or by one or more computing devices, such as the local electronic device 201 of FIG. 2 and/or the ticket station 501 of FIG. 5.

Figure 7:
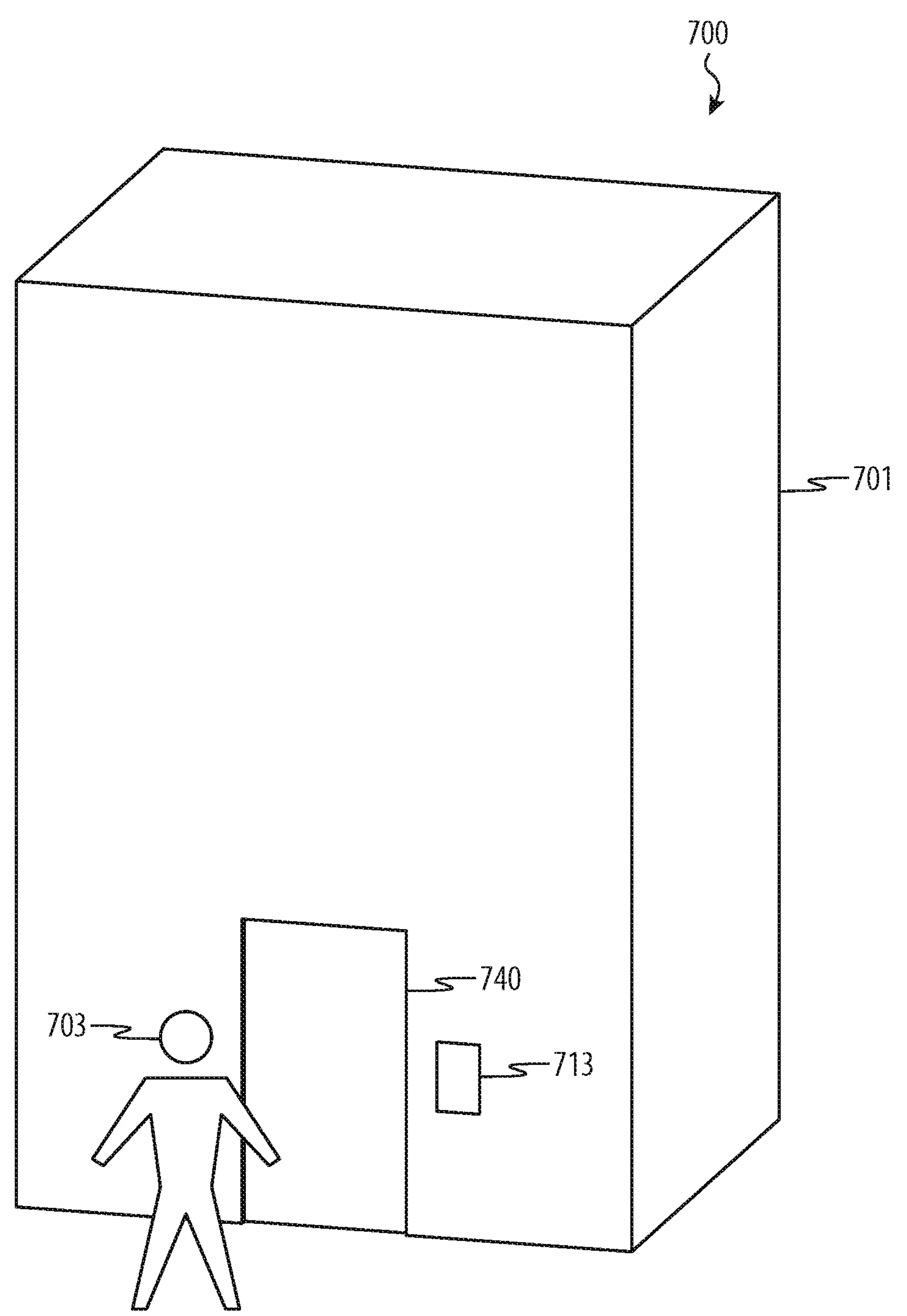
FIG. 7 depicts a fourth example identification system that uses a local cache for performing identifications.

FIG. 7 depicts a fourth example identification system 700 that uses a local cache for performing identifications. In this example, the identification system 700 may be an automated controlled access building 701. The automated controlled access building 701 may include a biometric reader device 713 and an access control mechanism 740. The automated controlled access building 701 may obtain a digital representation of a biometric using the biometric reader device 713, determine an identity by comparing the digital representation of the biometric to cached biometric identification information, and allow access by controlling the access control mechanism 740 if information in cached identity information associated with the identity indicates that the person 703 has permission to enter the automated controlled access building 701.

For example, the biometric reader device 713 is illustrated as a fingerprint scanner and the access control mechanism 740 is illustrated as an automated door. The fingerprint scanner may obtain an image of the person's fingerprint, determine an identity by comparing the image to cached fingerprint images, and control the automated door to allow the person 703 inside if the person 703 has permission to enter the automated controlled access building 701.

Figure 8:
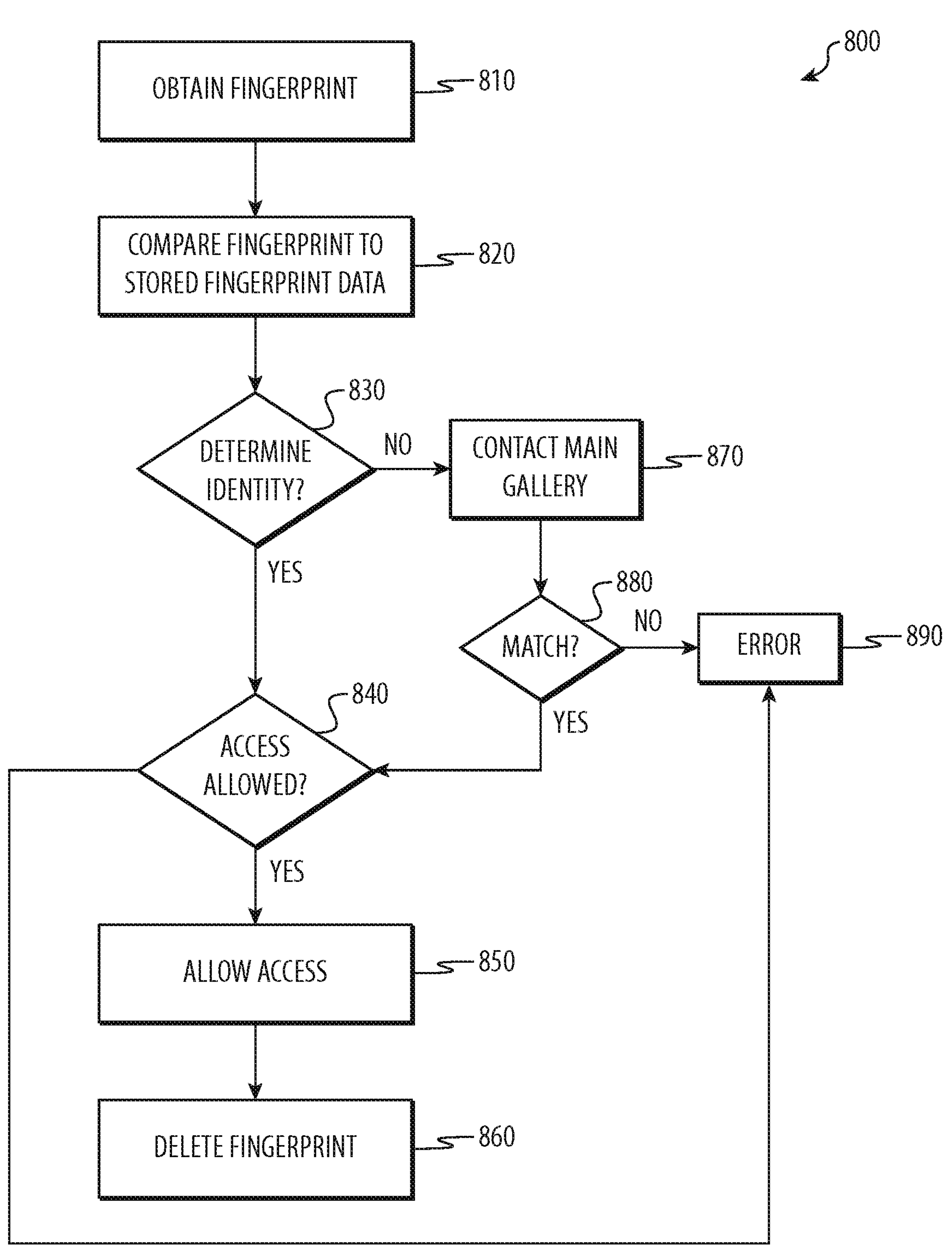
FIG. 8 depicts a flow chart illustrating a third example method for using a local cache to perform identifications. This method may be performed by the systems of FIGS. 2 and/or 7.

FIG. 8 depicts a flow chart illustrating a third example method 800 for using a local cache to perform identifications. This method 800 may be performed by the systems 200, 700 of FIGS. 2 and/or 7.

At operation 810, an electronic device (such as the local electronic device 201 of FIG. 2 and/or the automated controlled access building 701 of FIG. 7) may obtain a fingerprint. At operation 820, the electronic device may compare the fingerprint to stored fingerprint data that is associated with stored identity information. At operation 830, the electronic device may determine whether or not an identity can be determined by matching the fingerprint to stored (or cached) fingerprint data that is associated with stored (or cached) identity information. If so, the flow may proceed to operation 840. Otherwise, the flow proceeds to operation 870.

At operation 840, after the electronic device determines the identity, the electronic device may determine whether or not stored identity information associated with the identity indicates to allow access. If so, the flow may proceed to operation 850. Otherwise, the flow may proceed to operation 890 where the electronic device determines that an error has occurred.

At operation 850, after the electronic device determines that stored identity information associated with the identity indicates to allow access, the electronic device may allow access. Allowing access may include controlling an access control mechanism. The flow may then may proceed to operation 860 where the electronic device may delete the fingerprint.

At operation 870, after the electronic device determines that the identity cannot be determined by matching the fingerprint to stored fingerprint data, the electronic device may contact a main gallery. The main gallery may be fingerprint data and identity information stored and maintained by an identity system device from which the stored fingerprint data and stored identity information were derived. Contacting the main gallery may include transmitting a digital representation of the fingerprint, such as a hash or other representation. The flow may then proceed to operation 880 where the electronic device determines whether or not a match is received from the main gallery. In the case of a match, the electronic device may receive an identity from the main gallery, identity information associated with the identity, and so on. If so, the flow may proceed to operation 840. Otherwise, the flow proceeds to operation 890 where the electronic device may determine that an error has occurred.

Although the example method 800 is illustrated and described as including particular operations performed in a particular order, it is understood that this is an example. In various implementations, various orders of the same, similar, and/or different operations may be performed without departing from the scope of the present disclosure.

For example, operation 860 is illustrated and described as deleting the fingerprint. This may protect the privacy of the fingerprint by not storing the fingerprint once the electronic device no longer needs the fingerprint. This may also reduce electronic device storage requirements. However, it is understood that this is an example. In other implementations, the electronic device may delete, erase, or otherwise flush a variety of other data as well (such as a portion of the stored fingerprint data and/or the stored identity information that corresponds to the fingerprint, data related to whether or not access was allowed, and so on). Various configurations are possible and contemplated without departing from the scope of the present disclosure.

In various examples, this example method 800 may be implemented as a group of interrelated software modules or components that perform various functions discussed herein. These software modules or components may be executed within a cloud network and/or by one or more computing devices, such as the local electronic device 201 of FIG. 2 and/or the automated controlled access building 701 of FIG. 7.

Figure 9:
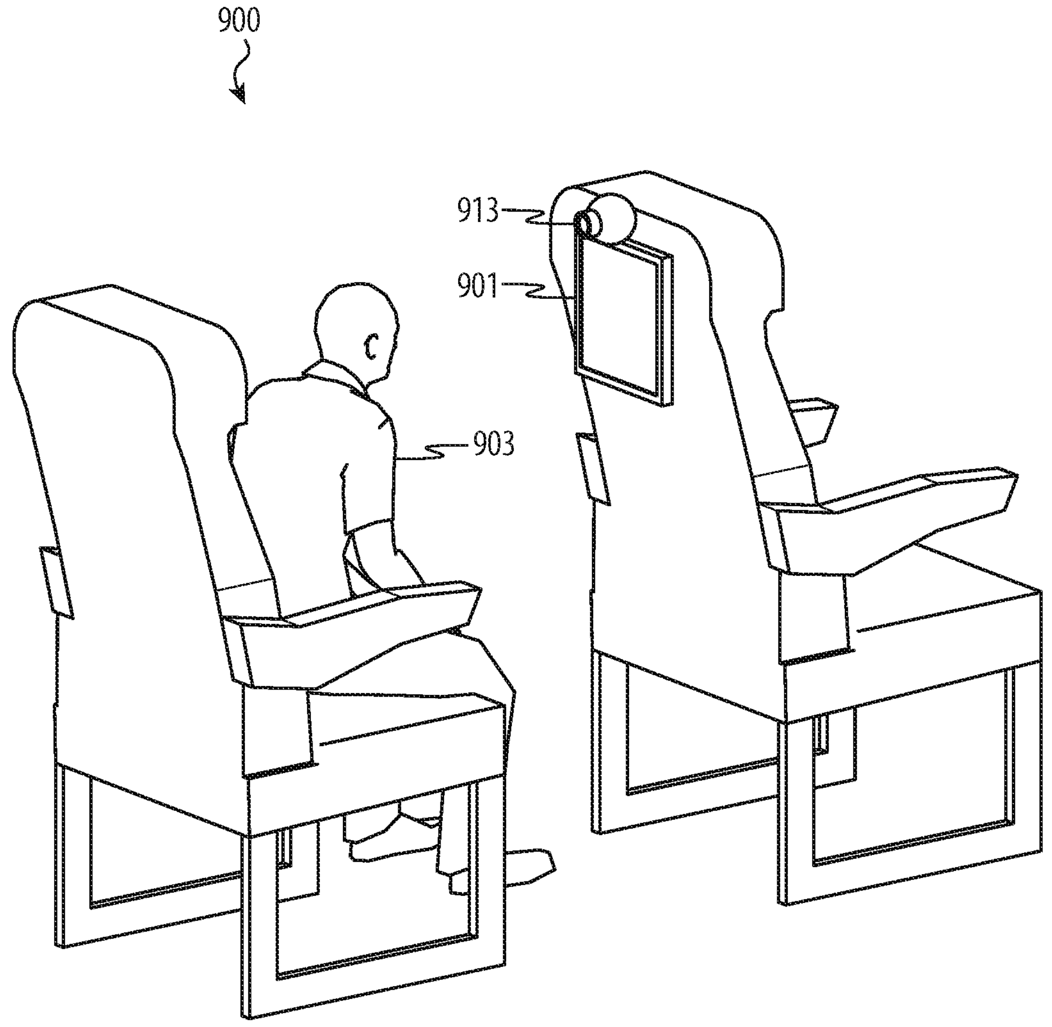
FIG. 9 depicts a fifth example identification system that uses a local cache for performing identifications.

FIG. 9 depicts a fifth example identification system 900 that uses a local cache for performing identifications. In this example, the identification system 900 may be an individual point of sale device 901 on an airplane. The individual point of sale device 901 may include a biometric reader device 913. A person 903 may use the individual point of sale device 901 to request goods and/or services, such as an alcoholic beverage. The individual point of sale device 901 may obtain a digital representation of a biometric using the biometric reader device 913, determine an identity by comparing the digital representation of the biometric to cached biometric identification information, and arrange for a request to be fulfilled or denied based on information in cached identity information associated with the identity.

For example, the individual point of sale device 901 may cache identity information and biometric identification information for all of the passengers on a plane's flight manifest. As everyone on a plane should be on the plane's flight manifest, the individual point of sale device 901 may be able to minimize the amount of identity information and biometric identification information to be cached in order to operate.

The individual point of sale device 901 may then receive a request for an alcoholic beverage from the person 903, use the biometric reader device 913 (shown as a camera that obtains a facial image, an iris image, a retina image, and so on) to obtain a digital representation of a biometric, identify the person 903, determine a verified age for the person from the cached identity information associated with the person's identity, and arrange for the request to be fulfilled (such as by signaling cabin crew to fulfill the request, dispensing the alcoholic beverage, and so on) if the person's verified age meets a legal threshold (such as twenty one years of age, eighteen years of age, and so on) for the consumption of alcoholic beverages. The individual point of sale device 901 may also determine payment information associated with the person's identity and process payment using the payment information. This may enable the individual point of sale device 901 to verify age and/or payment for requested alcoholic beverages during a flight even if the individual point of sale device 901 cannot currently communicate with a central database storing age and/or payment information.

By way of another example, one or more electronic devices on an aircraft or at another location may cache identification information and/or identity information for one or more pilots and/or other staff scheduled to use and/or work on the aircraft. Should a person report as staff whose identification information and/or identity information is not cached, additional security procedures may be performed to ensure the person is validly assigned to use and/or work on the aircraft. Various configurations are possible and contemplated without departing from the scope of the present disclosure.

Figure 10:
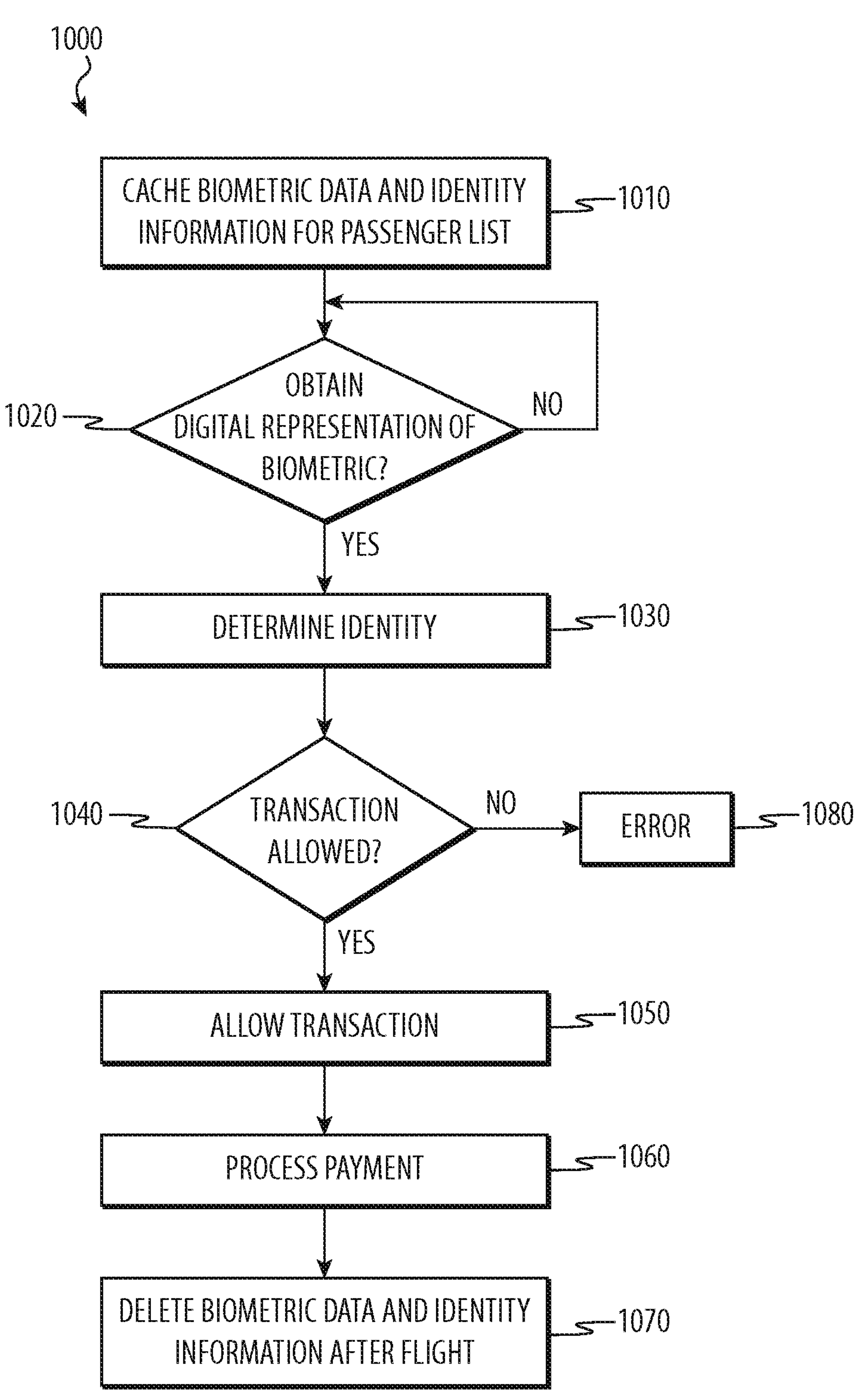
FIG. 10 depicts a flow chart illustrating a fourth example method for using a local cache to perform identifications. This method may be performed by the systems of FIGS. 2 and/or 9.

FIG. 10 depicts a flow chart illustrating a fourth example method 1000 for using a local cache to perform identifications. This method 1000 may be performed by the systems 200, 900 of FIGS. 2 and/or 9.

At operation 1010, an electronic device (such as the local electronic device 201 of FIG. 2 and/or the individual point of sale device 901 of FIG. 9) may cache biometric data and identity information for a passenger list of a flight. The flow may then proceed to operation 1020 where the electronic device may determine whether or not a digital representation of a biometric is received. If not, the flow may return to operation 1020 where the electronic device again determines whether or not a digital representation of a biometric is received. Otherwise, the flow may proceed to operation 1030.

At operation 1030, the electronic device may use the digital representation of the biometric to determine an identity. The flow may then proceed to operation 1040 where the electronic device determines whether or not information in the cached identity information associated with the identity indicates that the transaction is allowed (such as whether or not the cached identity information indicates that a verified age of the person meets or exceeds a threshold age for the transaction, whether or not payment information is available to use for the transaction, and so on). If not, the flow may proceed to operation 1080 where the electronic device determines that an error has occurred. Otherwise, the flow may proceed to operation 1050.

At operation 1050, the electronic device may determine to allow the transaction. The flow may then proceed to operation 1060 where the electronic device may process payment for the transaction. Next, the flow may proceed to operation 1070 where the electronic device may delete all of the biometric data and the identity information after the flight is complete.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described in the context of a flight. However, it is understood that this is an example. In various implementations, the method 1000 may be used in other contexts, such as a train trip, a bus ride, an assigned seat at an event venue, and so on. Various configurations are possible and contemplated without departing from the scope of the present disclosure.

By way of another example, the method 1000 is illustrated and described as both determining whether or not the transaction is allowed and processing payment. However, it is understood that this is an example. In various implementations, one or more of these features may be performed without performing the other. Various configurations are possible and contemplated without departing from the scope of the present disclosure.

In various examples, this example method 1000 may be implemented as a group of interrelated software modules or components that perform various functions discussed herein. These software modules or components may be executed within a cloud network and/or by one or more computing devices, such as the local electronic device 201 of FIG. 2 and/or the individual point of sale device 901 of FIG. 9.

Figure 11:
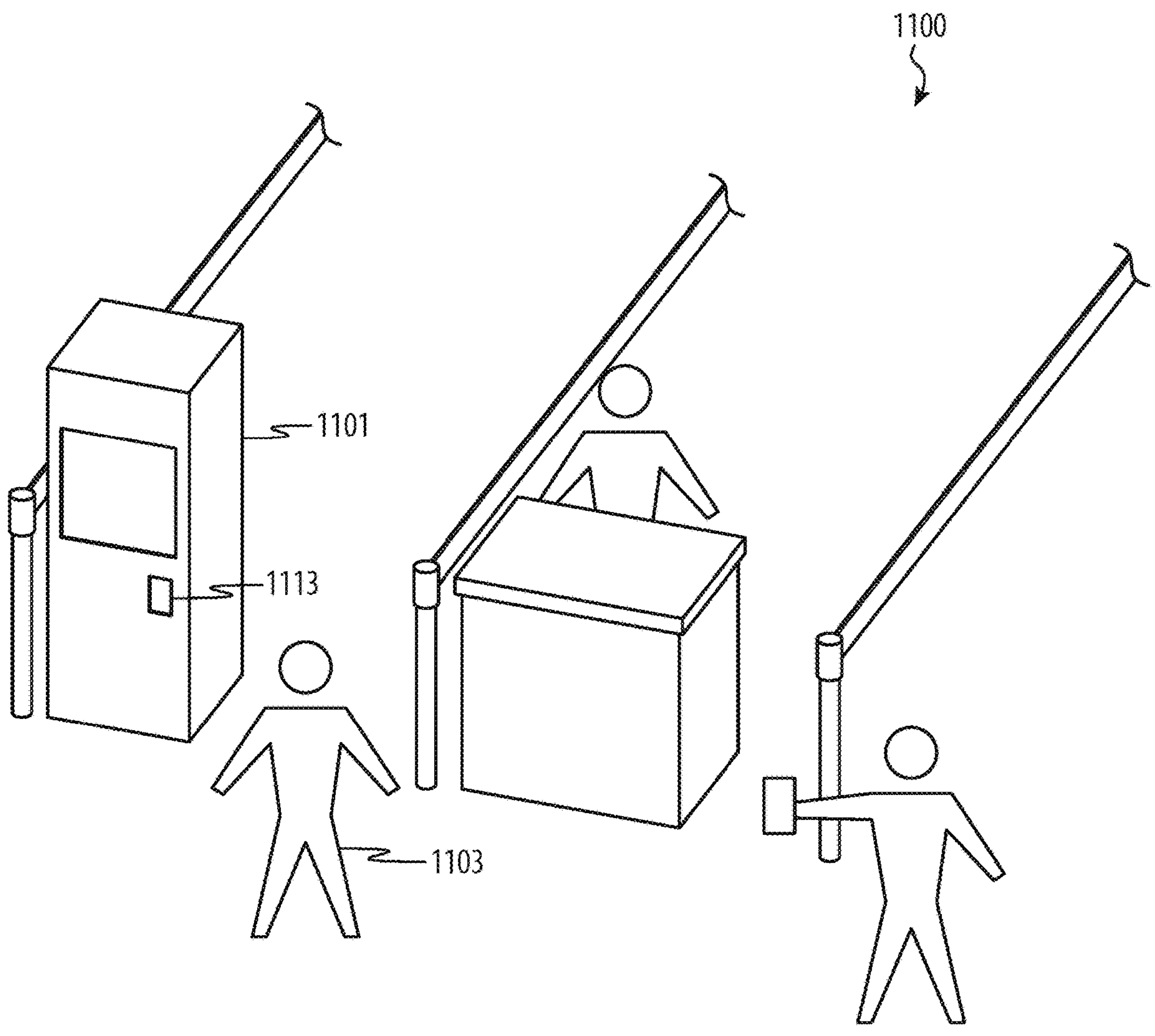
FIG. 11 depicts a sixth example identification system that uses a local cache for performing identifications.

FIG. 11 depicts a sixth example identification system 1100 that uses a local cache for performing identifications. In this example, the identification system 1100 may be a security screening device 1101 at an airport. The security screening device 1101 may cache biometric identification information and identity information for all of the people who have flights scheduled for a period of time, such as two days, from an airport where the screening device is located. In some implementations, the people who have flights scheduled for the time period may be determined using one or more flight manifests.

The security screening device 1101 may include a biometric reader device 1113 that the security screening device 1101 may use to obtain a digital representation of a biometric from a person 1103. The security screening device 1101 may determine an identity by comparing the digital representation of the biometric to cached biometric identification information and allow access if information in cached identity information associated with the identity indicates that the person 1103 has a ticket for a flight from the airport during the time period.

In some implementations, the security screening device 1101 may delete the digital representation of the biometric and/or the corresponding cached biometric identification information and/or identity information after the person 1103 is allowed access. This may minimize storage requirements for the security screening device 1101 as the person has already been allowed access.

In some situations, the person 1103 may exit after having passed the security screening device 1101 prior to their flight and attempt to reenter. In such an example, as the security screening device 1101 may have already deleted the biometric identification information and/or identity information corresponding to the person 1103, the security screening device 1101 may fail to identify the person 1103 using the cached biometric identification information and/or identity information. In such a situation, the security screening device 1101 may communicate with an identity system device from which the biometric identification information and/or identity information was originally cached to identify the person. Various configurations are possible and contemplated without departing from the scope of the present disclosure.

In another example, the security screening device 1101 may cache a portion of one or more third party databases and/or other electronic devices that relate to security screening. For example, the security screening device 1101 may cache a portion of a federal no fly database and/or other blacklist, criminal watch list, and so on. In some implementations, the security screening device 1101 may cache the portion of such a third party database and/or other electronic device associated with all of the people who have flights scheduled for a period of time. In this way, the security screening device 1101 may be able to use the information from the third party database and/or other electronic device without actually currently communicating with the third party database and/or other electronic device. Various configurations are possible and contemplated without departing from the scope of the present disclosure.

Figure 12:
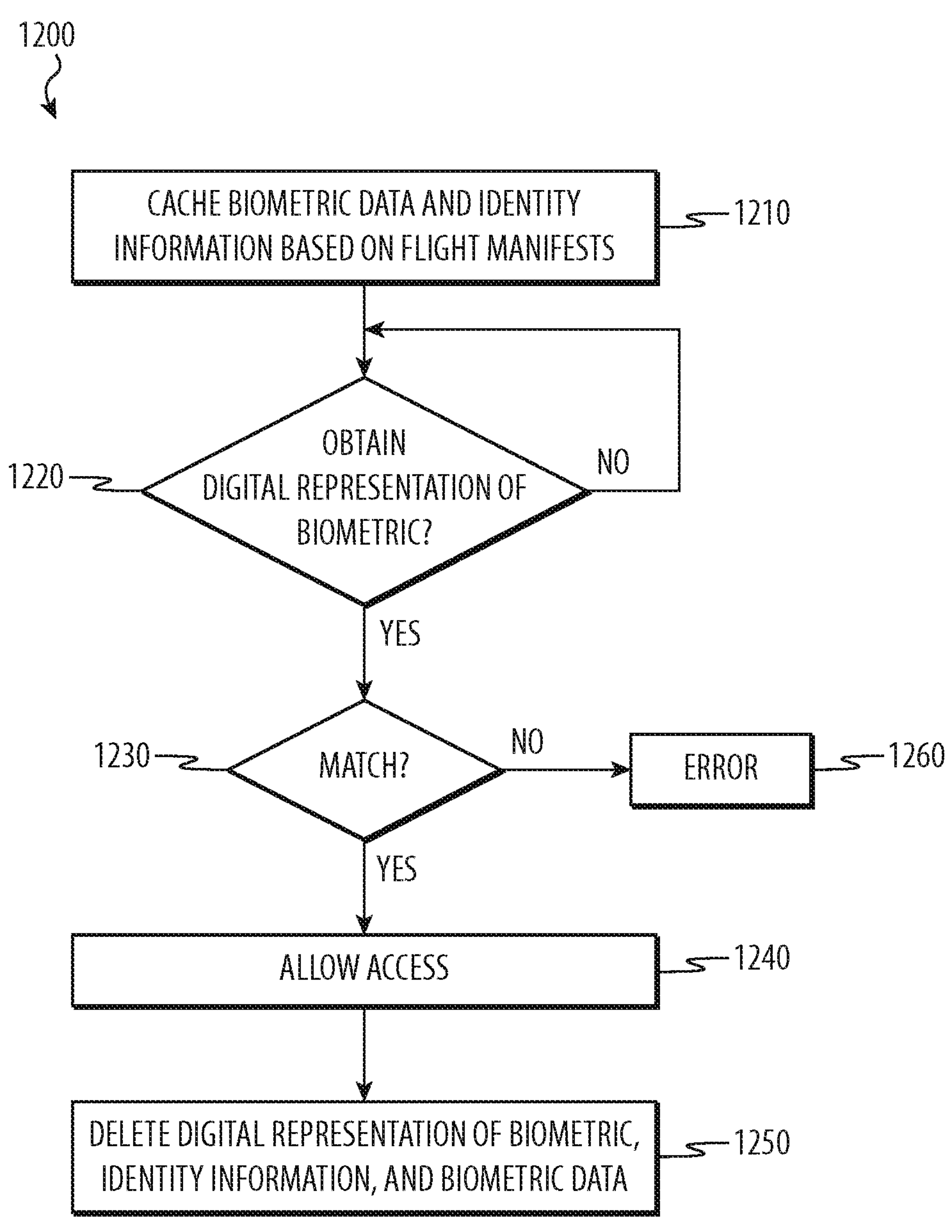
FIG. 12 depicts a flow chart illustrating a fifth example method for using a local cache to perform identifications. This method may be performed by the systems of FIGS. 2 and/or 11.

FIG. 12 depicts a flow chart illustrating a fifth example method 1200 for using a local cache to perform identifications. This method 1200 may be performed by the systems 200, 1100 of FIGS. 2 and/or 11.

At operation 1210, an electronic device (such as the local electronic device 201 of FIG. 2 and/or the security screening device 1101 of FIG. 11) may cache biometric data and identity information based on one or more flight manifests. For example, biometric data and identity information for people who have flights from a particular airport within a particular time period may be cached using one or more flight manifests.

At operation 1220, the electronic device may determine whether or not a digital representation of a biometric is received. If not, the flow may return to operation 1220 where the electronic device may again determine whether or not a digital representation of a biometric is received. Otherwise, the flow may proceed to operation 1230.

At operation 1230, the electronic device may determine whether or not there is a match between the digital representation of the biometric and cached biometric data and identity information. If not, the flow may proceed to operation 1260 where the electronic device may determine that an error has occurred. Otherwise the flow may proceed to operation 1240.

At operation 1240, the electronic device may allow access. The flow may then proceed to operation 1250 where the electronic device may delete the digital representation of the biometric and the corresponding cached biometric data and the identity information.

Although the example method 1200 is illustrated and described as including particular operations performed in a particular order, it is understood that this is an example. In various implementations, various orders of the same, similar, and/or different operations may be performed without departing from the scope of the present disclosure.

For example, operation 1250 illustrates and describes the electronic device deleting the digital representation of the biometric and the corresponding cached biometric data and the identity information. However, it is understood that this is an example. In some implementations, the electronic device may omit deleting one or more of the digital representation of the biometric, the corresponding cached biometric data, and/or the corresponding identity information. Various configurations are possible and contemplated without departing from the scope of the present disclosure.

In various examples, this example method 1200 may be implemented as a group of interrelated software modules or components that perform various functions discussed herein. These software modules or components may be executed within a cloud network and/or by one or more computing devices, such as the local electronic device 201 of FIG. 2 and/or the security screening device 1101 of FIG. 11.

Figure 13:
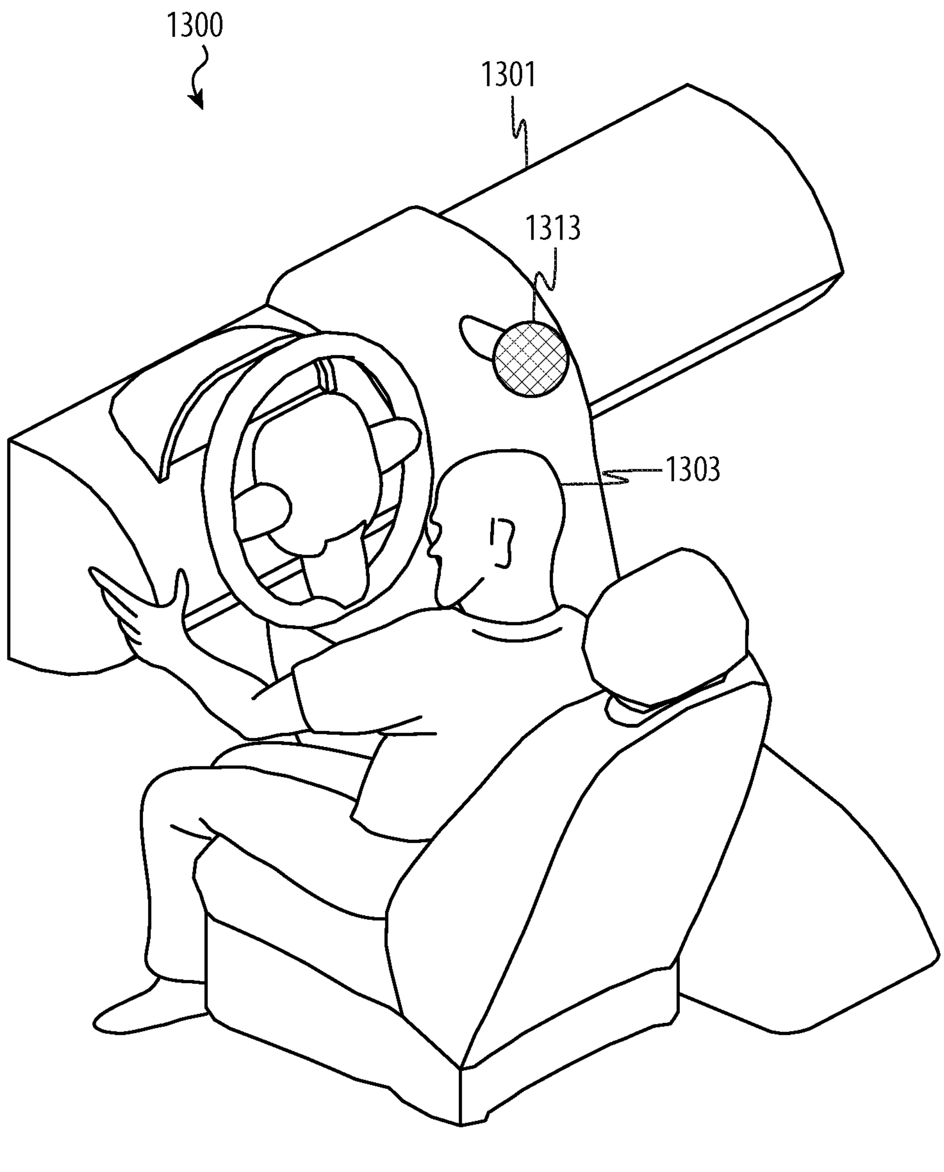
FIG. 13 depicts a seventh example identification system that uses a local cache for performing identifications.

FIG. 13 depicts a seventh example identification system 1300 that uses a local cache for performing identifications. In this example, the identification system 1300 may be a vehicle 1301. The vehicle 1301 may include a biometric reader device 1313, which is illustrated as a microphone that obtains a voiceprint for a person 1303. The vehicle 1301 may obtain the voiceprint (and/or another digital representation of a biometric) using the biometric reader device 1313 (and/or other biometric reader device), determine an identity by comparing the voice print to cached biometric identification information, and allow operation of the vehicle 1301 if the person 1303 has permission to operate the vehicle 1301 as specified in identity information cached by the vehicle 1301.

In various implementations, a group of people may have one or more sets of permissions with respect to operating the vehicle 1301. In such implementations, the vehicle 1301 may cache biometric identification information and identity information for each of the group of people.

In some implementations, the identity information may specify one or more configuration options for the vehicle 1301 for the person 1303. For example, such configuration options may include a seat position, vehicle temperature, entertainment system settings, control settings, time and/or location of permitted operation, and so on. In such implementations, the vehicle 1301 may control one or more components according to the configuration options upon determining the identity.

Figure 14:
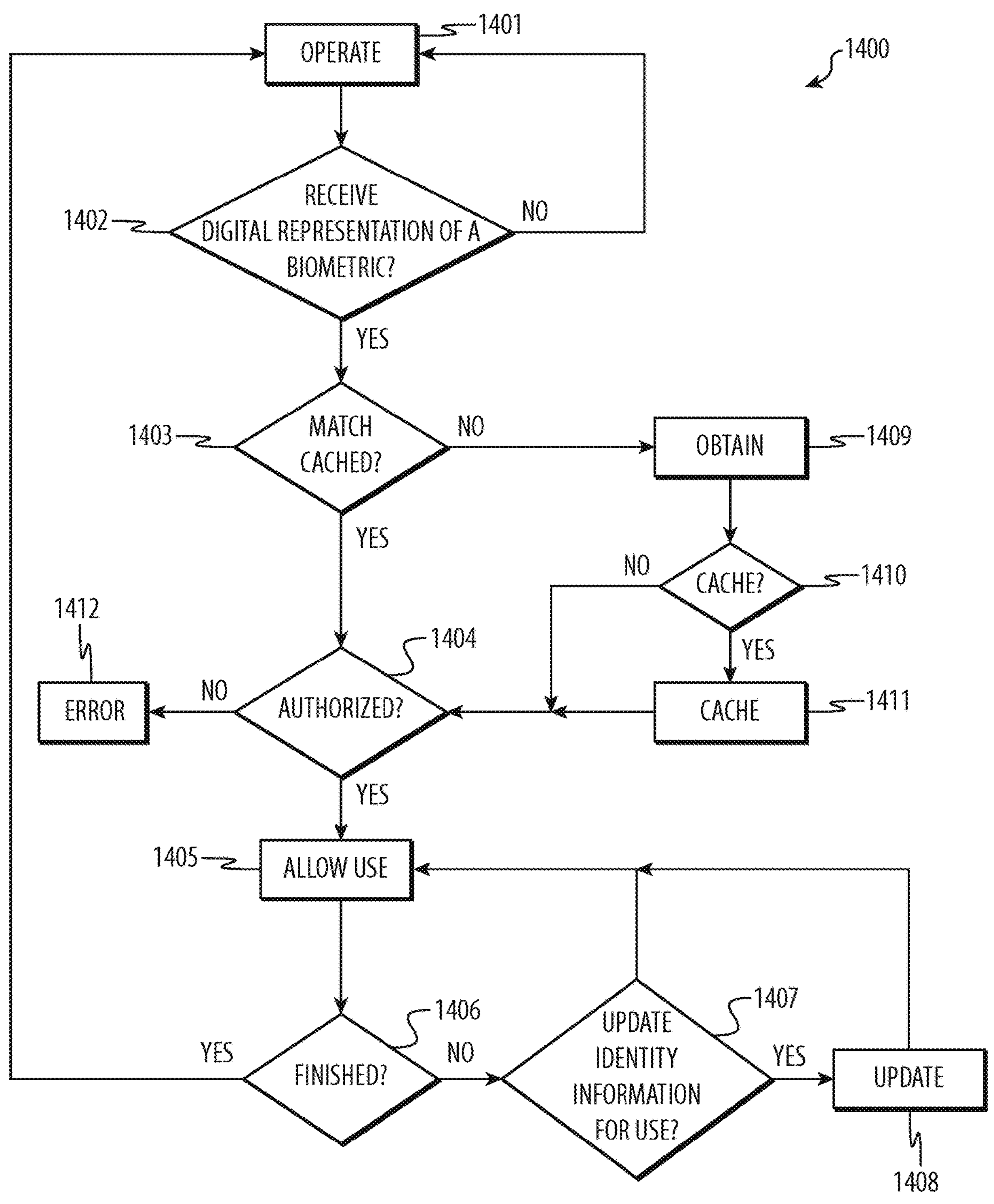
FIG. 14 depicts a flow chart illustrating a sixth example method for using a local cache to perform identifications. This method may be performed by the systems of FIGS. 2 and/or 13.

FIG. 14 depicts a flow chart illustrating a sixth example method 1400 for using a local cache to perform identifications. This method 1400 may be performed by the systems 200, 1300 of FIGS. 2 and/or 13.

At operation 1401, an electronic device (such as the local electronic device 201 of FIG. 2 and/or the vehicle 1301 of FIG. 13) operates. The flow may proceed to operation 1402 where the electronic device determines whether or not a digital representation of a biometric is received. If not, the flow may proceed to operation 1401 where the electronic device continues to operate. Otherwise, the flow may proceed to operation 1403.

At operation 1403, the electronic device may determine whether or not the digital representation of the biometric matches cached biometric identification information. If so, the flow may proceed to operation 1404. Otherwise, the flow may proceed to operation 1409.

At operation 1404, after the electronic device determines that the digital representation of the biometric matches the cached biometric identification information, the electronic device may determine whether or not cached identity information associated with the matched cached biometric identification information indicates that use is authorized. If not, the flow may proceed to operation 1412 where the electronic device may determine that an error has occurred. Otherwise, the flow may proceed to operation 1405.

At operation 1405, the electronic device may allow use of the electronic device. The flow may then proceed to operation 1406 where the electronic device may determine whether or not use is finished. If so, the flow may return to operation 1401 where the electronic device continues to operate. Otherwise, the flow may proceed to operation 1407.

At operation 1407, the electronic device may determine whether or not to update identity information based on the use. In some implementations, the electronic device may update identity information when the use modifies the identity information. For example, the identity information may indicate that use of the electronic device is authorized when a person has not previously misused the electronic device (such as where the electronic device is a vehicle and misuse of the vehicle involves driving outside speed limits, not obeying traffic signals, striking other vehicles, and so on). As such, if the use of the electronic device constitutes misuse, the electronic device may update the identity information to indicate that use is no longer authorized. If the electronic device determines to update the identity information, the flow may proceed to operation 1408 where the electronic device may update the identity information before the flow returns to operation 1405. Otherwise, the flow may proceed directly to operation 1405.

At operation 1409, after the electronic device determines that the digital representation of the biometric does not match the cached biometric identification information, the electronic device may obtain identity information associated with digital representation of the biometric. The electronic device may obtain the identity information by communicating with an identity service device. The flow may then proceed to operation 1410 where the electronic device determines whether or not to cache the identity information and/or the digital representation of the biometric. For example, the electronic device may determine to cache the identity information and/or the digital representation of the biometric when the identity information indicates that the digital representation of the biometric is associated with a person who is a permitted user of the electronic device. If so, the flow may proceed to operation 1411 where the electronic device may cache the identity information and/or the digital representation of the biometric before the flow proceeds to operation 1404. Otherwise, the flow may proceed directly to operation 1404.

Although the example method 1400 is illustrated and described as including particular operations performed in a particular order, it is understood that this is an example. In various implementations, various orders of the same, similar, and/or different operations may be performed without departing from the scope of the present disclosure.

For example, the method 1400 is illustrated and described as continuing to allow use after updating the identity information based on the use of the electronic device. However, in some implementations, updating the identity information based on use of the electronic device may remove authorization to use the electronic device. In such an example, the electronic device may instead cease allowing operation. Various configurations are possible and contemplated without departing from the scope of the present disclosure.

In various examples, this example method 1400 may be implemented as a group of interrelated software modules or components that perform various functions discussed herein. These software modules or components may be executed within a cloud network and/or by one or more computing devices, such as the local electronic device 201 of FIG. 2 and/or the vehicle 1301 of FIG. 13.

Although the present disclosure is illustrated and described in the context of caching information from a central system at local electronic devices and updating the central system for actions performed by the local electronic devices, it is understood that this is an example. In some implementations, the central system may include a number of electronic devices that operate in a cooperative computing arrangement to centrally store information. In such implementations, one or more devices in the central system may receive updates from the local electronic devices and subsequently use the techniques disclosed herein to provide those updates to other devices in the central system, such as examples where devices are located in each time zone and communicate updates received from local electronic devices to devices in an adjacent time zone upon the occurrence of various conditions, such as hourly. Various configurations are possible and contemplated without departing from the scope of the present disclosure.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to an identification system that uses a local cache for performing identifications. An identity system device may store identity information and identification information. One or more electronic devices may store a cache of a portion of the identity information and a part of the identification information. Such an electronic device may allow controlled access to the cached identity information using the cached identification information. For example, the cached identification information may include cached biometric identification information. The electronic device may receive user input, determine an identity by comparing the user input to the cached identification information, and perform an action using information in the cached identity information that is associated with the identity. In this way, the electronic device performs identifications locally without requiring communication with the identity system device but also uses the identity system device to centrally store and maintain the identity information and the identification information that is used to protect the identity information.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:

an identity system device that stores identity information and biometric information for multiple people; and a local electronic device that:

obtains a digital representation of a biometric for a person;

upon determining that the digital representation of the biometric corresponds to data in a local cache, omits identifying the person;

upon determining that the digital representation of the biometric does not correspond to the data in the local cache:

communicates with the identity system device to identify the person; and stores the digital representation of the data in the local cache; and deletes a portion of the data in the local cache corresponding to the digital representation of the biometric after a time period.

2. The system of claim 1, wherein the time period is determined according to at least one parameter regarding information to store in the data in the local cache.

3. The system of claim 2, wherein the at least one parameter relates to at least a portion of the identity information.

4. The system of claim 2, wherein the at least one parameter relates to a schedule.

5. The system of claim 1, wherein the digital representation of the biometric corresponds to at least a portion of a face of the person.

6. The system of claim 1, wherein the time period is a first time period for the person and a second time period for an additional person.

7. The system of claim 1, wherein the local electronic device determines whether to allow access based on the identity of the person.

8. A system, comprising:

a non-transitory storage medium that stores instructions; and at least one processor that executes the instructions to:

obtain a digital representation of a biometric for a person;

upon determining that the digital representation of the biometric corresponds to data in a local cache, omit performing an action in response to identifying the person;

upon determining that the digital representation of the biometric does not correspond to the data in the local cache:

perform the action in response to identifying the person; and store the digital representation of the biometric in the local cache; and delete a portion of the data in the local cache corresponding to the digital representation of the biometric after a time period.

9. The system of claim 8, further comprising an access control mechanism operable to allow access.

10. The system of claim 8, wherein the action comprises communicating with an identity system device that stores identity information and biometric information for multiple people.

11. The system of claim 10, wherein the at least one processor is operable to receive a portion of the biometric information from the identity system device.

12. The system of claim 11, wherein the portion of the biometric information is determined according to a set of parameters.

13. The system of claim 8, wherein the at least one processor is operable to receive financial information corresponding to an identity of the person from the identity system.

14. The system of claim 8, further comprising a biometric reader device communicably coupled to the at least one processor.

15. A method, comprising:

obtaining a digital representation of a biometric for a person;

upon determining that the digital representation of the biometric corresponds to data in a local cache, omit performing an action in response to identifying the person;

upon determining that the digital representation of the biometric does not correspond to the data in the local cache:

perform the action in response to identifying the person; and store the digital representation of the biometric in the local cache.

16. The method of claim 15, further comprising deleting a portion of the data in the local cache corresponding to the digital representation of the biometric after a time period.

17. The method of claim 15, wherein the action comprises transmitting data to an identity system device.

18. The method of claim 17, wherein the identity system device is operable to provide identity information associated with the digital representation of the biometric in response to receiving the digital representation of the biometric.

19. The method of claim 17, wherein the identity system device stores identity information for multiple people.

20. The method of claim 15, further comprising storing biometric information for staff in the data in the local cache.

* * * * *